(12) United States Patent
Turner et al.

(10) Patent No.: US 10,339,058 B2
(45) Date of Patent: Jul. 2, 2019

(54) AUTOMATIC CACHE COHERENCY FOR PAGE TABLE DATA

(71) Applicant: QUALCOMM Incorporated, San Diego, CA (US)

(72) Inventors: Andrew Edmund Turner, San Diego, CA (US); Farrukh Hijaz, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/658,749

(22) Filed: Jul. 25, 2017

(65) Prior Publication Data

US 2018/0336133 A1 Nov. 22, 2018

Related U.S. Application Data

(60) Provisional application No. 62/506,733, filed on May 16, 2017, provisional application No. 62/506,720, filed on May 16, 2017.

(51) Int. Cl.
| | |
|---|---|
| *G06F 12/08* | (2016.01) |
| *G06F 12/0815* | (2016.01) |
| *G06F 12/0893* | (2016.01) |
| *G06F 12/0875* | (2016.01) |
| *G06F 12/1009* | (2016.01) |
| *G06F 12/1072* | (2016.01) |
| *G06F 12/084* | (2016.01) |
| *G06F 12/0811* | (2016.01) |
| *G06F 12/0831* | (2016.01) |

(52) U.S. Cl.
CPC ...... *G06F 12/0815* (2013.01); *G06F 12/0875* (2013.01); *G06F 12/0893* (2013.01); *G06F 12/1009* (2013.01); *G06F 12/1072* (2013.01); *G06F 12/084* (2013.01); *G06F 12/0811* (2013.01); *G06F 12/0833* (2013.01); *G06F 2212/1024* (2013.01); *G06F 2212/1028* (2013.01); *G06F 2212/1041* (2013.01); *G06F 2212/60* (2013.01); *G06F 2212/621* (2013.01); *G06F 2212/656* (2013.01)

(58) Field of Classification Search
CPC combination set(s) only.
See application file for complete search history.

(56) References Cited

U.S. PATENT DOCUMENTS

2011/0314224 A1* 12/2011 Piry ................... G06F 9/52
                                                     711/118

* cited by examiner

*Primary Examiner* — Yong J Choe
(74) *Attorney, Agent, or Firm* — The Marbury Law Group/Qualcomm

(57) ABSTRACT

Aspects include computing devices and methods implemented by the computing for automatic cache coherency for page table data on a computing device. Some aspects may include modifying, by a first processing device, page table data stored in a first cache associated with the first processing device, receiving, at a page table coherency unit, a page table cache invalidate signal from the first processing device, issuing, by the page table coherency unit, a cache maintenance operation command to the first processing device, and writing, by the first processing device, the modified page table data stored in the first cache to a shared memory accessible by the first processing device and a second processing device associated with a second cache storing the page table data.

30 Claims, 17 Drawing Sheets

AUTOMATIC CACHE COHERENCY FOR PAGE TABLE DATA

CROSS-REFERENCE TO RELATED APPLICATIONS

This application claims the benefit of priority under C.F.R. 371(c) of U.S. Provisional Application No. 62/506,733 entitled "Automatic Cache Coherency For Page Table Data" filed May 16, 2017 and U.S. Provisional Application No. 62/506,720 entitled "Automatic Cache Coherency For Page Table Data" filed May 16, 2017. The entire contents of both of these applications are hereby incorporated by reference.

BACKGROUND

Computing devices employ page tables to organize data that is used to translate virtual memory address used by processing devices to physical memory addresses of memory devices. To achieve certain performance goals, computing devices store data of the page tables in cache memory of the processing devices for faster access than access to other memory devices for reading and modifying the page table data.

Page tables are often shared by multiple processing devices so that the processing devices have the same view of and access to a memory device. A processing device, such as a central processing unit (CPU), can change the page table data stored in its cache. To maintain the shared view and access to the memory device, updates for these changes are required to the page table data shared by the other processing devices and the page table data stored in their caches. When page table data is stored locally in caches of the respective processing devices, software of the CPU must perform explicit cache maintenance operations for changes to the page table data before other processing devices access a memory location for which the changed page table data specifies the translation to the physical address of the memory location. These cache maintenance operations incur software maintenance and performance costs that slowdown performance of the computing device. Alternatively, system (or shared) memory management unit (SMMU) page table lookups can be executed via input/output-coherent (IO-coherent) accesses. These IO-coherent accesses experience unbounded quality of service latencies, such as unknown snoop response delays, that cannot be tolerated by real time clients.

SUMMARY OF THE INVENTION

Various aspects include methods of automatic cache coherency for page table data on a computing device. Various aspects may include a computing device modifying, by a first processing device, page table data stored in a first cache associated with the first processing device, receiving, at a page table coherency unit, a page table cache invalidate signal from the first processing device, issuing, by the page table coherency unit, a cache maintenance operation command to the first processing device, and writing, by the first processing device, the modified page table data stored in the first cache to a shared memory accessible by the first processing device and a second processing device associated with a second cache storing the page table data.

Some aspects may include executing, by the page table coherency unit, a page table walk of the modified page table data stored in the first cache, in which issuing a cache maintenance operation command may include issuing the cache maintenance operation command for a page table entry of the page table walk. Such aspects may further include identifying, by the page table coherency unit, a modified page table entry in the modified page table data, wherein issuing a cache maintenance operation command for the page table entry of the page table walk may include issuing the cache maintenance operation command for the modified page table entry in the modified page table data of the page table walk. Such aspects may further include storing, by the page table coherency unit in a third cache, the page table data stored in the first cache, wherein executing a page table walk of the modified page table data may include executing the page table walk using the page table data stored in the third cache.

In some aspects, the page table cache invalidate signal may include a virtual address of the page table entry of the modified page table data, and executing a page table walk of the modified page table data may include executing the page table walk searching for the virtual address of the page table entry of the modified page table data.

In some aspects, executing a page table walk of the modified page table data may include executing the page table walk of the modified page table data via a master memory management unit communicatively connected to the page table coherency unit.

Some aspects may further include determining, by the page table coherency unit, whether the cache maintenance operation command is completed by the first processing device, and sending, by the page table coherency unit, a first acknowledgement of the page table cache invalidate signal to the first processing device in response to determining that the cache maintenance operation command is completed by the first processing device. In such aspects, sending a first acknowledgement of the page table cache invalidate signal may include sending the first acknowledgement of the page table cache invalidate signal to a master memory management unit, and sending, by the master memory management unit, a second acknowledgement of the page table cache invalidate signal configured to represent the first acknowledgement to the first processing device.

Various aspects may include methods of automatic cache coherency for data on computing devices. Various aspects may include sending, by a first processing device, identifying information of a location of data stored in a first cache associated with the first processing device to a page table coherency unit, monitoring, by the page table coherency unit, for a write command by the first processing device to the first cache for the location of the data, issuing, by the page table coherency unit, a cache maintenance operation command to the first processing device, and writing, by the first processing device, the data modified as a result of the write command from the first processing device and stored in the first cache to a shared memory accessible by the first processing device and a second processing device associated with a second cache storing the data.

In some aspects, the data may be page table data, and sending identifying information of a location of data may include sending a physical address range containing the page table data in the first cache, and monitoring for a write command by the first processing device to the first cache for the location of the data may include monitoring for a write command in the physical address range of the cache. Such aspects may further include storing, by the page table coherency unit, the physical address range.

In some aspects, sending identifying information of a location of data may include sending a virtual address range and an address space identifier containing the data in the first cache, and monitoring for a write command by the first processing device to the first cache for the location of the data may include monitoring for a write command including a target virtual address in the virtual address range and a target address space identifier the same as the address space identifier. Such aspects may further include storing, by the page table coherency unit, the virtual address address range and the address space identifier.

Some aspects may include monitoring, by the page table coherency unit, for a write command by a third processing device to the first cache including a target virtual address in the virtual address range and a target address space identifier the same as the address space identifier.

In some aspects, monitoring for a write command by the first processing device to the first cache for the location of the data may include monitoring for a write command via a fully coherent port of the page table coherency unit.

Some aspects may include implementing a synchronization operation for the second cache selected from one of sending, by the first processing device, a page table cache invalidate signal to the second processing device, sending, by the first processing device, an explicit synchronization command to the second processing device, and waiting, by the second processing device, a designated period prior to implementing the synchronization operation.

Some aspects may further include waiting, by the page table coherency unit, a designated period before issuing the cache maintenance operation command to the first processing device.

Various aspects include a computing device including a first processing device, a second processing device, a memory, and a page table coherency unit each configured to perform operations of the methods summarized below. Various aspects include a computing device including means for performing functions of the methods summarized below. Various aspects include a non-transitory processor-readable medium on which is stored processor-executable instructions configured to cause a processor of a computing device to perform operations of the methods summarized below.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

DETAILED DESCRIPTION

Figure 1:
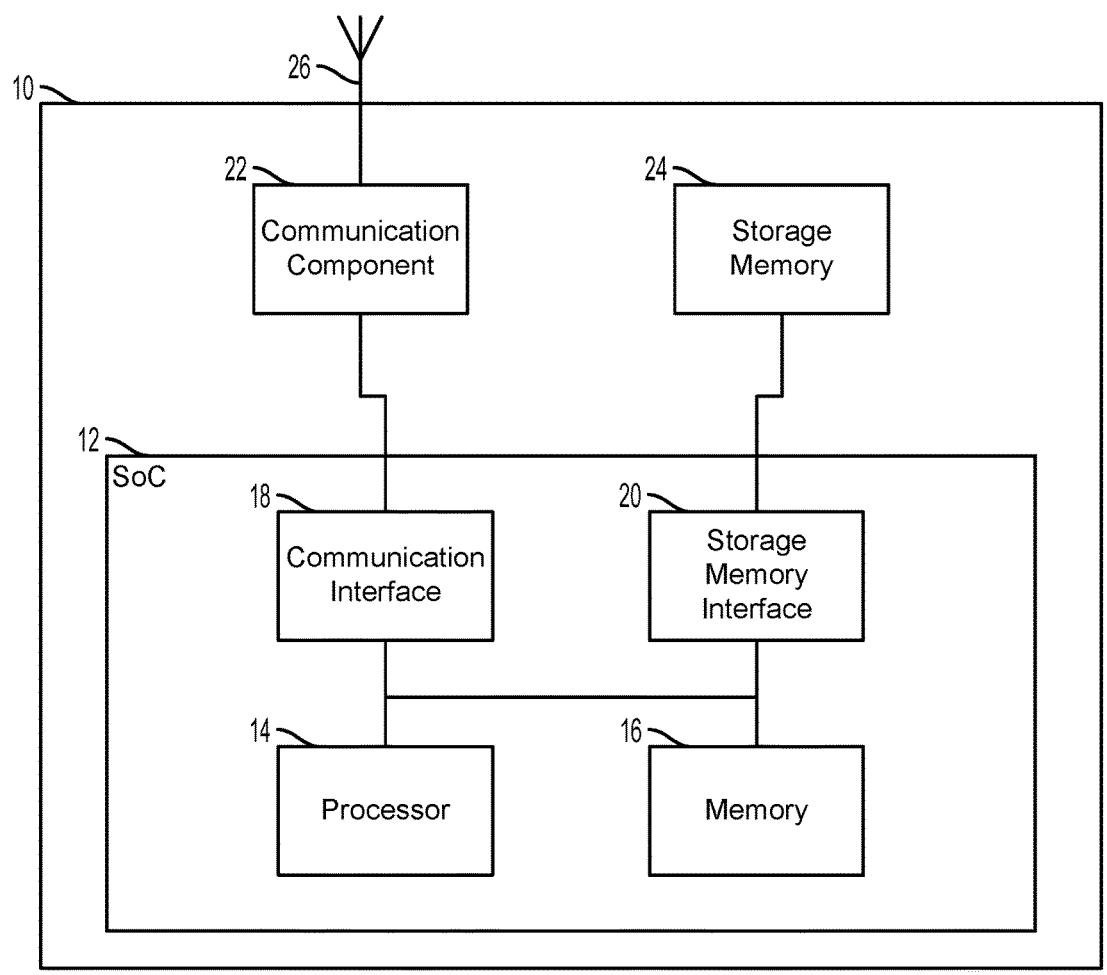
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods, and systems and devices implementing such methods for automatically maintaining cache coherency for page table data stored in caches of multiple processing devices. The device and methods of the various aspects may include receiving or intercepting page table cache invalidate signals, walking a page table in a cache to the invalidated pages, issuing clean and/or invalidate cache commands for the page table data to the processing device associated with the cache storing the page table data, and stalling completion of page table cache synchronization operations until all referenced page table pages are cleaned and/or invalidated in the cache of the processing device.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Page tables are stored in cache memory for the performance benefits of increased speed in accessing and modifying the page table data by a processing device and/or hardware accelerator (referred to collectively herein as "processing device") over accessing and modifying the page table data stored in a memory, such as a main memory comprising random access memory (RAM). Various processing devices may store copies of the same page table data in respective caches associated with each of the processing devices to realize these performance benefits. However, each of the processing devices may modify the page table data stored in its respective cache resulting in the processing devices no longer using the same page table data to translate virtual addressed to physical addresses of a memory shared by the processing devices. Discrepancies in the page table data used by the processing device may cause data and program errors. Processing devices may suffer from performance lags from current uses of cache maintenance operations prior to a processing device accessing the shared memory via the translations of its cache's copy of the page table data or system/shared memory management unit (SMMU) page table lookups via input/output-coherent (I/O-coherent) accesses to the shared memory. Implementing a page table coherency unit may maintain coherent copies of the page table data in the various caches for use by respective processing devices while improving on the performance lags of the current mechanisms for maintaining coherency between multiple cached copies of the page table data.

In various aspects, a page table coherency unit (PTCU) may receive or intercept page table cache invalidate signals, such as distributed virtual memory invalidate signal and/or translation lookaside buffer invalidate signals sent from a processing device that has made modifications to the copy of the page table data stored in the cache associated with the processing device. The page table coherency unit may walk the page table to the invalidated pages in the cache associated with the processing device that sent the page table cache invalidate signals. The page table coherency unit may issue clean and/or invalidate cache commands for the page table data to the processing device to prompt the processing device to execute the cache maintenance commands for its associated cache. The page table coherency unit may stall completion of page table cache synchronization operations until all referenced page table pages are cleaned and/or invalidated in the cache of the processing device. Completion of the synchronization operations for the processing devices sharing the page table data allows the processing device to access the modified page table data in the shared memory, and each of the processing device may obtain and cache a copy of the page table data that is coherent with the copies of the page table data obtained and cached by the other processing devices.

In various aspects, the page table coherency unit may include a coherent port to monitor memory regions accessible via a coherent interconnect. In various aspects, monitoring the memory regions may use an existing coherency protocol used by the processing device, such as the MESI (Modified Exclusive Shared Invalid) protocol, the MOESI (Modified Owned Exclusive Shared Invalid) protocol, etc. The implementation of a coherent port may allow the page table coherency unit to monitor accesses, such as write operations, to memories connected to the coherent interconnect, such as the caches storing the copies of the page table data, to monitor for modifications to the copies of the page table data. In various aspects, physical addresses for stage 2 page table storage in the caches may be available to the page table coherency unit. The physical addresses may be monitored by the page table coherency unit and respond to modifications of the page table data by issuing clean and/or invalidate commands to the processing device associated with the cache in which the page table data is modified.

In various aspects, monitored write commands to a cache may include virtual addresses, address space identifiers (ASID), and/or other identifying information, such as a physical address, for the modified data in the cache, which may be any data including page table data. The various aspects described herein with respect to page table data stored in a cache may be similarly applied for any data stored in the cache. The page table coherency unit may store associations between a real time client executed by a processing device and reserved virtual address ranges, address space identifiers, and/or the other identifying information for data stored in a cache. Monitoring a write command to a cache may trigger the page table coherency unit to compare the information included in the write command with the data of the stored associations to determine whether the write command targets a portion of the cache in which the data is stored. As with the other aspects, determining that the page table data is targeted, and potentially modified, the page table coherency unit may respond by issuing clean and/or invalidate commands to the processing device associated with the cache in which the data is modified. In various aspects, the page table coherency unit may be configured to delay the response to the determining that the data is targeted and potentially modified for a designated period.

Implementation of a page table coherency unit to manage coherency between copies of page table data stored on multiple caches associated with different processing devices provides performance benefits over current coherency management schemes for various reasons.

By actively managing the coherency of the multiple copies of the page table data, SMMUs for processing devices running real time clients may not need to execute snoops of the cache to determine whether data is located at the addresses specified in the page table data since the page table data is updated whenever it is changed by any of the processing devices. Reducing or eliminating snoop execution reduces the time, power, and resources, needed to access data and execute tasks using the data.

The page table coherency unit may be configured to keep the page tables coherent. Relying on the capabilities of the page table coherency unit, programmers may not have to program and software may not have to execute costly cache maintenance operations prior to the processing device issuing the page table cache invalidate signals. This is because the page table coherency unit may automatically issue cache maintenance commands in response to the page table cache invalidate signals and in parallel with the other processing devices responding to these signals. This may consolidate the time needed to implement coherency operations because the cache maintenance operations may be executed concurrently with rather than prior to the page table invalidate signals.

Consolidation of operations may also be realized by implementing the page table coherency unit as the page table cache invalidate signals may double as a trigger for signaling for the clean and/or invalidate cache maintenance operations, rather than having separate signaling for triggering the cache maintenance operations for the modified page table data and the page table cache invalidation for the other copies of the page table data.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
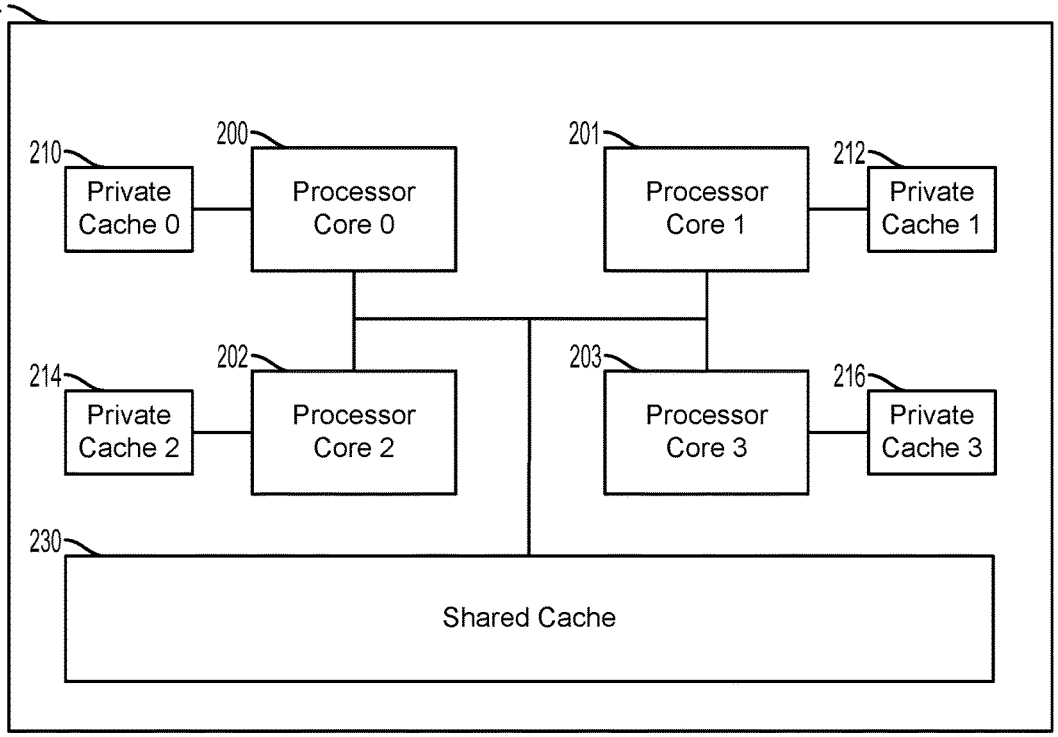
FIG. 2 is a component block diagram illustrating an example multicore processor suitable for implementing an aspect.

FIG. 2 illustrates a multicore processor suitable for implementing an aspect. The multicore processor 14 may include multiple processor types, including, for example, a CPU and various hardware accelerators, including for example, a GPU and/or a DSP. The multicore processor 14 may also include a custom hardware accelerator, which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a GPU or a DSP, and the processor cores 200, 201, 202, 203 may be homogeneous graphics processor cores or digital signal processor cores, respectively. The multicore processor 14 may be a custom hardware accelerator with homogeneous processor cores 200, 201, 202, 203.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous multicore processors 14. In various aspects, not all of the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured to read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein. For ease of reference, the terms "hardware accelerator," "custom hardware accelerator," "multicore processor," "processor," and "processor core" may be used interchangeably herein.

Figure 3:
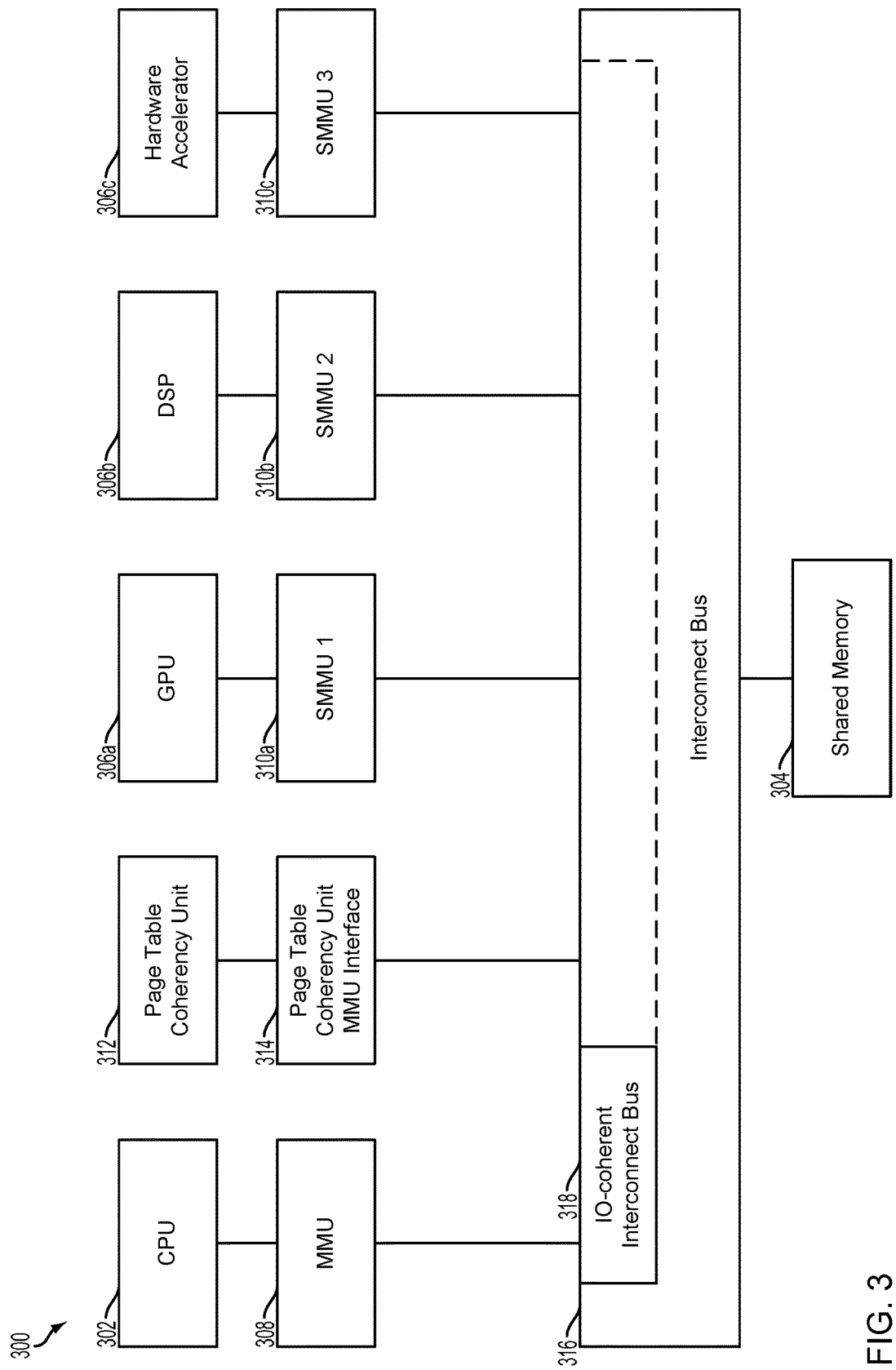
FIG. 3 is a block diagram illustrating an example heterogeneous computing device with a page table coherency unit suitable for implementing an aspect.

FIG. 3 illustrates an example aspect of a heterogeneous computing device. A heterogeneous computing device 300 (e.g., the computing device 10 illustrated in FIG. 1) may include at least two, but up to any integer number "N" processing devices (e.g., processor 14 in FIGS. 1 and 2). For example, the heterogeneous computing device 300 may include a processing device (e.g., a CPU) 302, a hardware accelerator (e.g., GPU) 306a, a hardware accelerator (e.g., DSP) 306b, and/or a custom hardware accelerator 306c. Each processing device 302, 306a, 306b, 306c may be associated with caches (e.g., private caches 210, 212, 214, 216, and/or shared cache 230 in FIG. 2). The caches may be integrated with the associated processing device 302, 306a, 306b, 306c. Alternatively, the caches may be separate but communicatively connected to the associated processing device 302, 306a, 306b, 306c.

Each processing device 302, 306a, 306b, 306c may be associated with a memory management unit configured to receive memory access requests and responses to and from various memories (including the caches and/or other memory devices, such as the memory 16 and 24 illustrated in FIG. 1), to translate between virtual memory addresses recognized by the processing device 302, 306a, 306b, 306c and physical memory addresses of the memories, and to control the flow of and to direct the memory access requests and responses to their destinations. For example, the CPU 302 may be associated with the memory management unit (MMU) 308, the GPU 306a may be associated with an SMMU 310a (SMMU1), the DSP 306b may be associated with an SMMU 310b (SMMU 2), and the custom hardware accelerator 306c may be associated with an SMMU 310c (SMMU 3). In various aspects, the memory management units 308, 310a, 310b, 310c may be integrated with or separate from the associated processing devices 302, 306a, 306b, 306c. For example, the MMU is shown outside the CPU, but in many cases the MMU will be inside the memory management unit 308, may be an integrated component of the CPU 302, and may be integrated before a cache of the CPU 302.

The associated processing devices 302, 306a, 306b, 306c and memory management units 308, 310a, 310b, 310c may be communicatively connected to the other processing devices 302, 306a, 306b, 306c and memory management units 308, 310a, 310b, 310c by an interconnect bus 316. The processing devices 302, 306a, 306b, 306c and memory management units 308, 310a, 310b, 310c may communicate via the interconnect bus by sending and receiving data, instructions, and other signals. In various aspects, at least a portion of the interconnect bus 316, such as an I/O-coherent interconnect bus 318, may be configured to support with I/O-coherency protocols, such as allowing a processing device 302, 306a, 306b, 306c to snoop the cache of another processing devices 302, 306a, 306b, 306c for data stored in the cache. The interconnect bus 316, including the I/O-coherent interconnect bus 318, may further communicatively connect the associated processing devices 302, 306a, 306b, 306c and the memory management units 308, 310a, 310b, 310c to a shared memory 304 (such as memory 16 and 24 illustrated in FIG. 1).

The shared memory 304 may be configured so that multiple partitions of the shared memory 304 may be configured for exclusive of shared access by the processing devices 302, 306a, 306b, 306c. The shared memory 304 may store page table having data for translating between virtual address used by the processing devices 302, 306a, 306b, 306c and physical addresses of the memories of the heterogeneous computing device 300, including the caches associated with the processing devices 302, 306a, 306b, 306c and the shared memory 304. The page table may be accessible by the various processing devices 302, 306a, 306b, 306c, and portions of the page table may be copied by the processing devices 302, 306a, 306b, 306c and stored to their respective caches for faster access than access to the shared memory 304. In various aspects, a processing device 302, 306a, 306b, 306c may make a modification to the page table data copied from the shared memory 304 and stored in its associated cache. The processing device 302, 306a, 306b, 306c may write the modifications to the page table stored in the shared memory 304. The other processing devices 302, 306a, 306b, 306c may check for such modifications in and/or copy portions of the page table stored in the shared memory 304 to maintain coherency between the page table data stored in their associated caches.

The heterogeneous computing device 300 may further include a page table coherency unit 312 configured to manage coherency of the page table data stored in the caches associated with the processing devices 302, 306a, 306b, 306c. The page table coherency unit 312 may be associated with a page table coherency unit MMU interface 314, which may be integrated with or separate from the page table coherency unit 312. The page table coherency unit MMU interface 314 may be configured to implement communication protocols so that the page table coherency unit 312 may communicate with and analyze communications from the processing devices 302, 306a, 306b, 306c. In some aspects including the I/O-coherent interconnect buss 318, the page table coherency unit 312 may be connected to the interconnect bus 316 through the page table coherency unit MMU interface 314.

In various aspects, the page table coherency unit 312 may be a component of the heterogeneous computing device 300 that is separate from the processing devices 302, 306a, 306b, 306c and the memory management units 308, 310a, 310b, 310c. In various aspects, the page table coherency unit 312 may be integrated as part of one or more of the memory management units 308, 310a, 310b, 310c. In various aspects, the page table coherency unit 312 may be integrated as a part of another component of the heterogeneous computing device 300, such as a translation buffer unit client of an SMMU translation control unit (not shown).

The page table coherency unit 312 may be configured to monitor for modifications made to the page table data stored in a cache associated with a processing device 302, 306a, 306b, 306c, such as the CPU 302. The page table coherency unit 312 may monitor for changes to the stored in cache pages table data using various techniques, which, in some aspects, may depend on a structure of the page table coherency unit 312.

In various aspects, the page table coherency unit MMU interface 314 may be configured to be recognized and/or be counted among the memory management units 308, 310a, 310b, 310c. As such, the page table coherent unit MMU interface may be targeted to receive communications by the processing devices 302, 306a, 306b, 306c and/or the memory management units 308, 310a, 310b, 310c. Through the page table coherency unit MMU interface 314, the page table coherency unit 312 may receive page table cache invalidate signals from the processing device 302, 306a, 306b, 306c that has modified its copy of the page table data stored in its associated cache.

In various aspects, the page table cache invalidate signals may include signals of various communication protocols, including translation lookaside buffer and/or distributed virtual memory communication protocols. In various aspects, the page table coherency unit MMU interface 314 may be configured to monitor for the received signals that may be configured to trigger a translation lookaside buffer invalidation in the caches associated with the other processing devices 302, 306a, 306b, 306c. In response to receiving these signals, the receiving processing devices 302, 306a, 306b, 306c may invalidate all or part of the page table data stored in their associated caches, and particularly stored in a translation lookaside buffer portion of the caches.

Invalidating the page table data in a cache may cause the processing device processing devices 302, 306a, 306b, 306c trying to access the invalidated portions of the page table data stored in their associated caches to access the page table data stored in the shared memory 304. As discussed further herein, the page table data in the shared memory 304 may be updated to reflect the changes made to the copy of the page table data in the cache associated with the processing device 302, 306a, 306b, 306c sending the page table invalidate signals prior to the access of the page table data in the shared memory 304 by the other processing devices 302, 306a, 306b, 306c. Therefore, the processing devices 302, 306a, 306b, 306c receiving the page table cache invalidate signals may retrieve updated page table data from the shared memory 304 so that the page table data in the caches associated with the processing devices 302, 306a, 306b, 306c may be coherent.

In various aspects, the page table coherency unit 312 may react to receiving the page table cache invalidate signals by implementing cache coherency for the page table data. In various aspects, the page table coherency unit 312 may walk the modified page table data stored in the cache associated with the processing device 302, 306a, 306b, 306c that sent the page table cache invalidate signals. In various aspects, the page table walk may walk to page table entries for virtual addresses specified by the page table cache invalidate signals. In various aspects, the page table walk may be implemented for the entire page table stored in the cache, such as when the page table cache invalidate signals may not specify the virtual addresses of the modified entries in the page tables stored in the caches. The page table walk may be used by the page table coherency unit 312 to obtain physical addresses of the cache containing the modified portions of the stored in cache page table data. In various aspects, the page table coherency unit 312 may be configured to implement the page table walks and/or used page table walkers of the memory management units 308, 310a, 310b, 310c to implement the page table walks. The latter aspects may reduce the components and hardware costs of the page table coherency unit 312.

In various aspects, the page table coherency unit 312 may be fully coherent with the processing device 302, 306a, 306b, 306c that modifies the copy of the page table data stored in its associated cache. In various aspects, to be fully coherent with the processing device 302, 306a, 306b, 306c that modifies the copy of the page table data, the page table coherency unit 312 may include a coherent port configured to monitor and retrieve updates to the cache associated with the processing device 302, 306a, 306b, 306c that modifies the copy of the page table data. In various aspects, the page table coherency unit 312 may be fully coherent with the processing device 302, 306a, 306b, 306c that modifies the copy of the page table data as an integrated component of the processing device 302, 306a, 306b, 306c. The fully coherent page table coherency unit 312 may be configured to store intermediate stage page table data that may be used between page table walks to increase performance speed of the page table walks.

In various aspects, the fully coherent page table coherency unit 312 may store virtual address ranges, address space identifiers, and/or other identifying information, such as physical addresses, associated with locations in the cache where data is stored, which may be any data including page table. The various aspects described herein with respect to page table data stored in a cache may be similarly applied for any data stored in the cache. The page table coherency unit 312 may monitor for write commands to the cache locations of the data by the processing device 302, 306a, 306b, 306c. The page table coherency unit 312 may identify the destination of the write command and compare the destination to the locations associated with the stored data. For write commands identified to be directed to the store data, the page table coherency unit 312 may extract the virtual address, address space identifier, and/or other identifying information of the write command.

The page table coherency unit 312 may be configured to use the physical addresses of the cache identified by the page table walk, and/or the virtual address, address space identifier, and/or other identifying information of the write commands to issue clean and/or invalidate commands to the processing device 302, 306a, 306b, 306c associated with the cache storing the modified page table data. The clean and/or invalidate commands may prompt the processing device 302, 306a, 306b, 306c to implement these cache maintenance operations causing the modifications to the page table data stored in the cache to be written to the page table stored in the shared memory 304. In various aspects, transmittal of the clean and/or invalidate signal may be implemented by the page table unit MMU interface 314.

In the meantime, after the processing device 302, 306a, 306b, 306c sends the page table cache invalidate signal, and acknowledgements to the page table cache invalidate signal from the other processing devices 302, 306a, 306b, 306c may be sent in respond. The acknowledgement may be configured to signal receipt of the page table cache invalidate signal. After completing that page table walk, the issuance of the clean and/or invalidate signals, and completion of the clean and/or invalidate commands, the page table coherency unit 312 may be configured to send an acknowledgement to the page table cache invalidate signal to the processing device 302, 306a, 306b, 306c that sent the page table cache invalidate signal. The acknowledgement from the page table coherency unit 312 may be an acknowledgement expected by the processing device 302, 306a, 306b, 306c that sent the page table cache invalidate signals. Until all of the acknowledgements have been received, the processing device 302, 306a, 306b, 306c may suspend operations using the modified portions of the page table data stored in its associated cache, preventing these operations from occurring unit the page table data may be coherent for the processing devices 302, 306a, 306b, 306c.

FIG. 3 illustrates non-limiting examples of a heterogeneous computing device 300. The examples illustrated and described herein with reference to FIG. 3 are non-limiting. The heterogeneous computing device may include any number and/or combination of processing devices, caches, memory management units, memories, interconnects, and connections between such components. In various aspects, any combination of the components of a heterogeneous computing device may be combined or separated and included as part of or distributed over multiple SoCs (e.g., SoC 12 illustrated in FIG. 1) which may be communicatively connected via the interconnect 316 or extensions of the interconnect 316.

The example hardware components illustrated in FIG. 3 are referred to in the descriptions of various aspects illustrated in FIGS. 4-15. However, this combination of hardware components is in no way limiting to the number or type processors and/or hardware accelerators that may be included as hardware components for implementing the various aspects described herein. The various aspects may be implemented using any combination of two or more processing devices.

Figure 4:
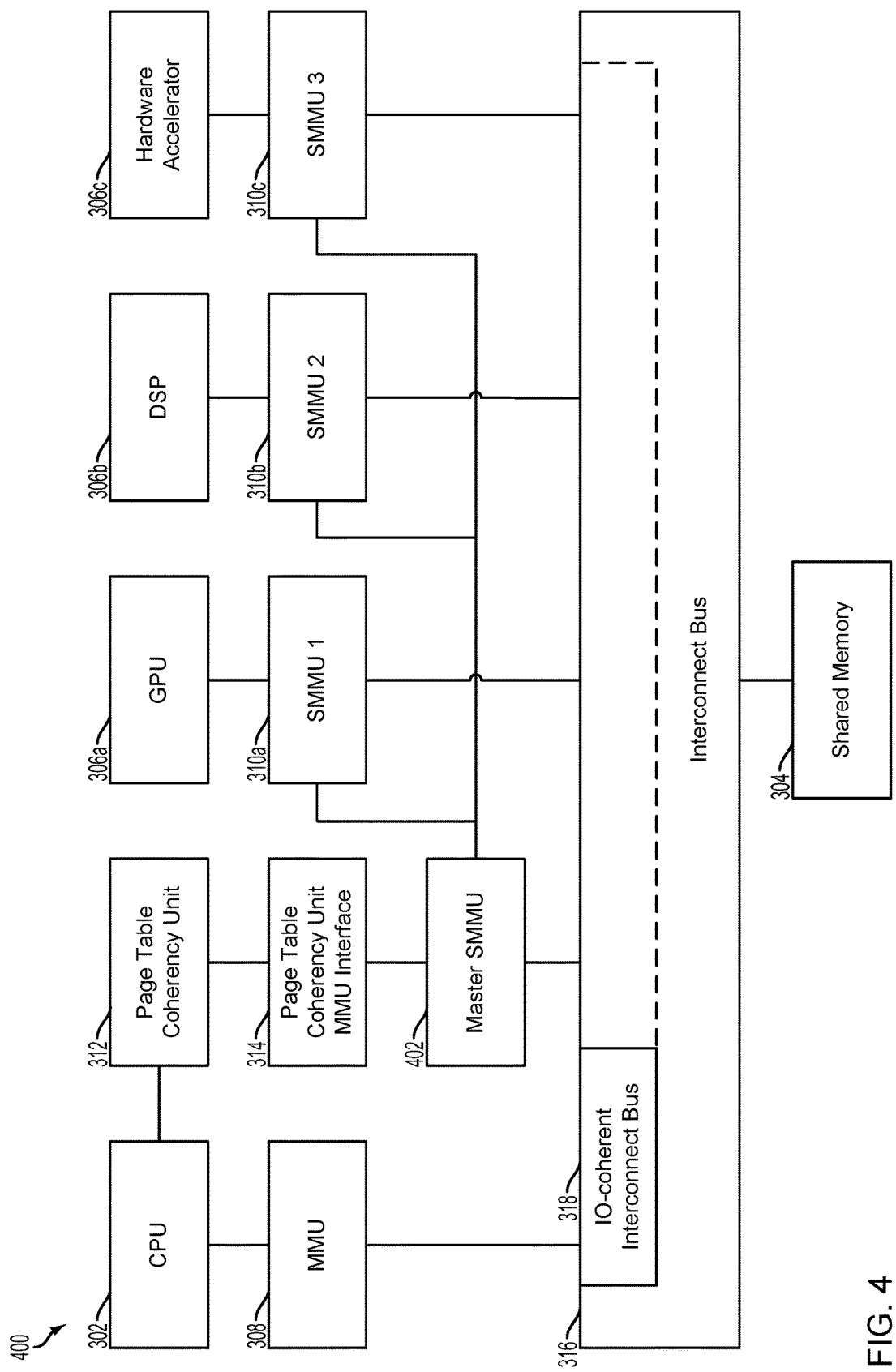
FIG. 4 is a block diagram illustrating an example heterogeneous computing device with a page table coherency unit and a master memory management unit suitable for implementing an aspect.

FIG. 4 illustrates an example aspect of a heterogeneous computing device. A heterogeneous computing device 400 (e.g., the computing device 10 illustrated in FIG. 1 and heterogeneous computing device 300 illustrated in FIG. 3) may include any combination of components as described herein with reference to FIG. 3. Such components may include the processing devices 302, 306a, 306b, 306c and their associated caches, the memory management units 308, 310a, 310b, 310c, the shared memory 304, the interconnect bus 316, including the I/O-coherent interconnect bus 318, the page table coherency unit 312, and the page table unit MMU interface 314. In various aspects, the configuration and arrangement of these components may be the same as or different from the components of the heterogeneous computing device 300 illustrated in FIG. 3.

The heterogeneous computing device 400 may include a master SMMU 402 configured to disseminate and collect communications between the SMMUs 310a, 310b, 310c, the page table unit MMU interface 314, and the memory management unit 308. In various aspects, the master SMMU 402 may also consolidate functionality shared by the SMMUs 310a, 310b, 310c, such as by having hardware configured to implement page table walks for the SMMUs 310a, 310b, 310c. In various aspects, the master SMMU 402 may be configured to include the page table coherency unit 312 and function as the page table unit MMU interface 314. The master SMMU 402 may be communicatively connected to the SMMUs 310a, 310b, 310c, the page table unit MMU interface 314, and the memory management unit 308 via the interconnect bus 316, including the I/O-coherent interconnect bus 318, and/or additional combined and/or dedicated communication lines. The master SMMU 402 may be configured to receive the page table cache invalidate signals from the processing device 302, 306a, 306b, 306c that modifies the copy of the page table data, and to direct the signals to their intended destinations. The master SMMU 402 may also be configured to receive the acknowledgements to the page table cache invalidate signals and direct the acknowledgements to the processing device 302, 306a, 306b, 306c that sent the page table cache invalidate signals. In various aspects, the master SMMU 402 may hold the acknowledgements until receiving all of the acknowledgements from the processing devices 302, 306a, 306b, 306c that receive the page table cache invalidate signals, and then send the acknowledgements and/or a combined acknowledgement.

The page table coherency unit 312 and the processing device 302, 306a, 306b, 306c that modifies the copy of the page table data may be communicatively connected by additional combined and/or a dedicated communication line. The page table coherency unit 312 may include a fully coherent port to communicate via a direct connection to the processing device 302, 306a, 306b, 306c that modifies the copy of the page table data.

As described herein, the page table coherency unit 312 may be configured by various mechanisms (e.g., monitoring page table cache invalidate signals and page table walks, and/or coherent monitoring of write commands to the cache) to identify when and where in a cache memory page table the data is modified by an associated processing device 302, 306a, 306b, 306c. In response to identifying a modification of page table data in a cache, the page table coherency unit 312 may use the information identifying where the page table data is modified in the cache to issue clean and/or invalidate commands to the processing device 302, 306a, 306b, 306c associated with the cache storing the modified page table data. Further, the page table coherency unit 312 may monitor for completion of the clean and/or invalidate commands the page table coherency unit 312 issued, and send an acknowledgement to the page table cache invalidate signals to the processing device 302, 306a, 306b, 306c that modified the page table data in its associated cache.

Figure 5:
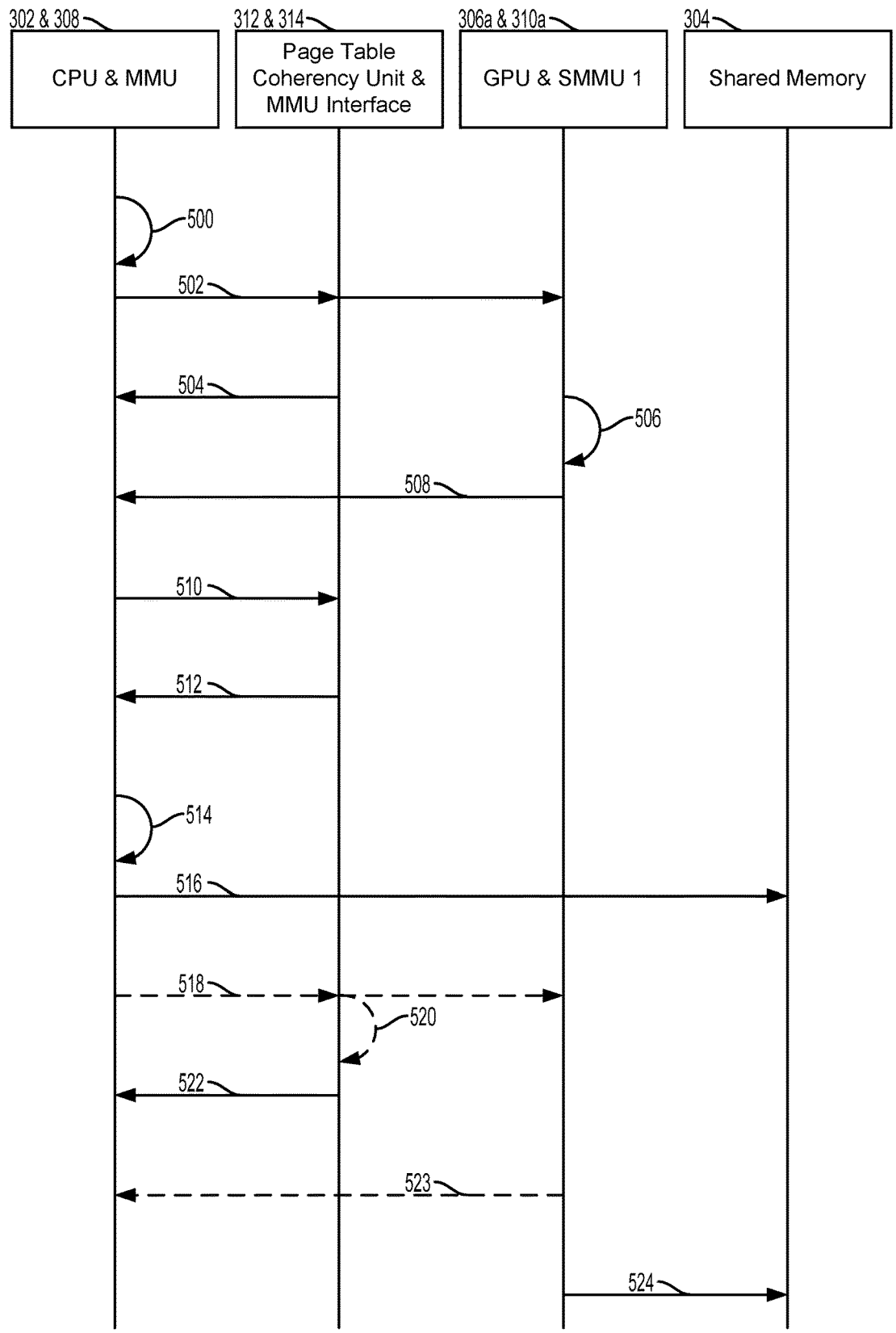
FIG. 5 is a component interaction flow diagram illustrating an example of an operation flow for automatic cache coherency for page table data for using a page table coherency unit implementing an aspect.

FIG. 5 illustrates an example of an operation flow for automatic cache coherency for page table data using a page table coherency unit implementing an aspect. The example illustrated in FIG. 5 relates to the structure of the heterogeneous computing device 300 illustrated in FIG. 3. The CPU 302, the memory management unit (MMU) 308, the GPU 306a, and the SMMU 310a (SMMU 1) are used as examples for ease of explanation and brevity, but are not meant to limit the number and/or types of processing devices (e.g., processor 14 in FIGS. 1 and 2, and processing devices 302, 306a, 306b, 306c in FIGS. 3 and 4. Further the order of the operations and signals 500-524 is used as an example for ease of explanation and brevity, but is not meant to limit the possible order of execution of the operations and signals 500-524 as several of the operations and signals 500-524 may be implemented in parallel and in other orders.

In the operation flow for automatic cache coherency for page table data using a page table coherency unit 312, for an operation 500, the CPU 302 may issue a write command and the memory management unit 308 may implement the write command to modify page table data stored in a cache associated with the CPU 302. The write command may be for a specific virtual address of the cache, and may also include other data for identifying for what data and where in the cache the modification is made, including an address space identifier and/or a physical address. The CPU 302 and the memory management unit 308 may send 502 page table cache invalidate signals to the page table coherency unit 312 via the page table coherency unit MMU interface 314 and the GPU 306a via the SMMU 310a.

In response to receiving the page table cache invalidate signal, the page table coherency unit 312 and/or the page table coherency unit MMU interface 314 may walk 504 the page table of the cache in which the page table data is modified. As discussed herein, the page table coherency unit 312 and/or the page table coherency unit MMU interface 314 may execute a targeted page table walk for specific virtual addresses specified in the page table data invalidate signal, or walk sections or all of the page table. Also in response to the page table cache invalidate signal, the GPU 306a and the SMMU 310a may implement 506 a page table cache invalidate for the page table data stored in a cache associated with the GPU 306a. The page table cache invalidate may be implemented for locations in the cache corresponding to identifying information, such as virtual addresses in the page table data specified by the page table cache invalidate, or for portions, including up to all, of the stored page table data identified during the page table walk.

The GPU 306a and/or the SMMU 310a may send 508 an acknowledgement of the page table cache invalidate signal. The acknowledgement may signify that the page table cache invalidate has been implemented and that the cache associated with the GPU 306a is coherent with regard to the page table data. In various aspects, the acknowledgement may be sent to the CPU 302.

The page table coherency unit 312 and/or the page table coherency unit MMU interface 314 may retrieve 510 a physical address in the shared memory 304 for a location of a modification of the page table data as a result of the page table walk using values in the cache associated with the CPU 302. The page table coherency unit 312 and/or the page table coherency unit MMU interface 314 may issue 512 a clean and/or invalidate cache maintenance command to the CPU 302 for the location in the cache of the modified page table data. The CPU 302 and the memory management unit 308 may implement 514 the clean and/or invalidate cache maintenance operation. The clean and/or invalidate cache maintenance operation may be executed for the location in the cache specified by the clean and/or invalidate cache maintenance command. The CPU 302 and the memory management unit 308 implementing the clean cache maintenance operation may write 516 the modified page table data to the page table stored in the shared memory 304. The modification to the page table data being written to and stored in the shared memory 304 makes the modified page table data available to other processing devices for use in updating the page table data stored in the respective associated caches to keep the page table data coherent across processing devices.

Synchronization with the CPU associated cache may be implemented in various manners. In various optional aspects, the CPU 302 and/or the memory management unit 308 may issue 518 an explicit command to each SMMU 310a and/or the page table coherency device MMU interface 314 to prompt synchronization operations. In various optional aspects, the page table coherency device 312 and/or the page table coherency device MMU interface 314 may wait 520 for a designated period prior to implementing a synchronization operation. The page table coherency device 312 and/or the page table coherency device MMU interface 314 may send 522 an acknowledgement of the page table cache invalidate signal to the CPU 302. In various aspects, the acknowledgement from the page table coherency device 312 and/or the page table coherency device MMU interface 314 may be sent to the CPU 302 and/or the memory management unit 308 in response to completion of the implementation 514 of the clean and/or invalidate cache maintenance operations. In various optional aspects, the page table coherency device 312 and/or the page table coherency device MMU interface 314 and/or the GPU 306a and/or the SMMU 310a may send 523 an acknowledgement to the CPU 302 in response to the explicit command from the CPU 302 and/or the memory management unit 308, and/or a lapse of the designated period. The GPU 302 may access 524 valid page tables in the shared memory 304.

Figure 6:
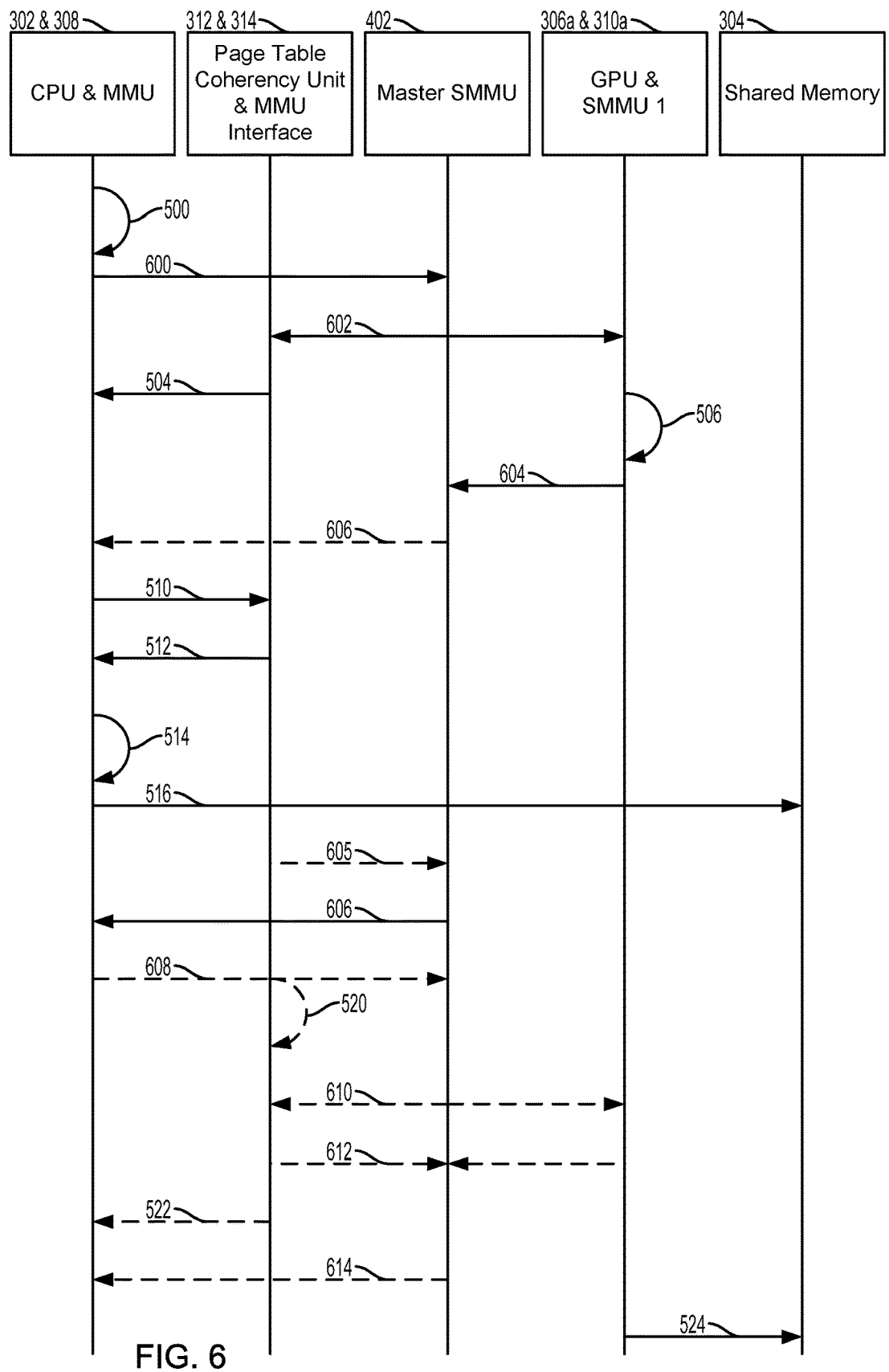
FIG. 6 is a component interaction flow diagram illustrating an example of an operation flow for automatic cache coherency for page table data using a page table coherency unit and a master memory management unit for implementing an aspect.

FIG. 6 illustrates an example of an operation flow for automatic cache coherency for page table data using a page table coherency unit and a master SMMU implementing an aspect. The example illustrated in FIG. 6 relates to the structure of the heterogeneous computing device 400 illustrated in FIG. 4. The CPU 302, the memory management unit (MMU) 308, the GPU 306a, and the SMMU 310a (SMMU 1) are used as examples for ease of explanation and brevity, but are not meant to limit the number and/or types of processing devices (e.g., processor 14 in FIGS. 1 and 2, and processing devices 302, 306a, 306b, 306c in FIGS. 3 and 4. Further, the order of the operations and signals 500, 506, 508-516, 520, 522, 524, and 600-614 is used as an example for ease of explanation and brevity, but is not meant to limit the possible order of execution of the operations and signals 500, 506, 508-516, 520, 522, 524, and 600-614 as several of the operations 500, 506, 508-516, 520, 522, 524, and 600-614 may be implemented in parallel and in other orders. Also for brevity and ease of explanation the operations and signals 500, 506, 508-516, 520, 522, 524 in the example illustrated in FIG. 6 may be implemented in a manner similar to the descriptions of operations and signals 500, 506, 508-516, 520, 522, 524 illustrated in FIG. 5.

Following a modification of the page data stored in the cache associated with the CPU 302 (operation 500), the CPU 402 and/or the memory management unit 304 may send a page table cache invalidate signal 600 to the master SMMU 402. Since the master SMMU 402 is communicatively connected to the SMMU 310a and the page table coherency unit MMU interface 314, the master SMMU 402 may direct 602 the page table cache invalidate signal to the GPU 306a via the SMMU 310a and to the page table coherency unit 312 via the page table coherency unit MMU interface 314. In response to receiving the page table cache invalidate signal, the GPU 306a and the SMMU 310a may implement 506 a page table cache invalidate for the page table data stored in a cache associated with the GPU 306a; and the page table coherency unit 312 and the page table coherency unit MMU interface 314 may walk 504 the page table of the cache in which the page table data is modified.

The GPU 306a and/or the SMMU 310a may send 604 an acknowledgement of the page table cache invalidate signal to the master SMMU 402. The acknowledgement may signify that the page table cache invalidate has been implemented and that the cache associated with the GPU 306a is coherent with regard to the page table data. The page table coherency unit 312 and the page table coherency unit MMU interface 314 may send 605 an acknowledgement of the page table cache invalidate signal to the master SMMU 402. The acknowledgement may be sent following completion of the page table walks and of the implementation 514 of the invalidate and/or clean operations. The master SMMU 402 may direct 606 any number of acknowledgements of the page table cache invalidate signal to the CPU 302. In various aspects, the acknowledgement may be an individual acknowledgement for each acknowledgement received by the master SMMU 402. In various aspects, the acknowledgement may be an acknowledgement representative of multiple, including all, of the acknowledgements received by the master SMMU 402.

The page table coherency unit 312 and/or the page table coherency unit MMU interface 314 may retrieve 510 a physical address in the cache for a location of a modification of the page table data as a result of the page table walk through the address translation stages down to the page table data stored in the shared memory 304. In various aspects, the page table walk may be implemented using values in the cache associated with the CPU 302. The page table coherency unit 312 and/or the page table coherency unit MMU interface 314 may issue 512 a clean and/or invalidate cache maintenance command to the CPU 302 for the location in the cache of the modified page table data. The CPU 302 and the memory management unit 308 may implement 514 the clean and/or invalidate cache maintenance operation. The CPU 302 and the memory management unit 308 implementing the clean cache maintenance operation may write 516 the modified page table data to the page table stored in the shared memory 304.

Synchronization with the CPU associated cache may be implemented in various manners. In various optional aspects, the CPU 302 and/or the memory management unit 308 may issue 608 an explicit command to the master SMMU 402. In various optional aspects, the master SMMU 402 may direct 610 the explicit command to an SMMU and/or the page table coherency device MMU interface 314 and/or the page table coherency device 312 and/or the page table coherency device MMU interface 314 to prompt synchronization operations. In various optional aspects, the page table coherency device 312 and/or the page table coherency device MMU interface 314 may wait 520 for a designated period prior to implementing a synchronization operation. In various optional aspects, the master SMMU 402 may receive 612 an acknowledgement of the explicit command from the SMMU and/or the page table coherency device MMU interface 314 and/or the page table coherency device 312 and/or the page table coherency device MMU interface 314. In various aspects, the page table coherency device 312 and/or the page table coherency device MMU interface 314 may send an acknowledgement 522 of the page table cache invalidate signal to the CPU 302. In various optional aspects, the master SMMU 402 may direct 614 any number of acknowledgements from the page table coherency device 312 and/or the page table coherency device MMU interface 314 and/or the GPU 306a and/or the SMMU 310a to the CPU 302 in response to the explicit command from the CPU 302 and/or the memory management unit 308, and/or a lapse of the designated period. The GPU 302 may access 524 valid page tables in the shared memory 304.

Figure 7:
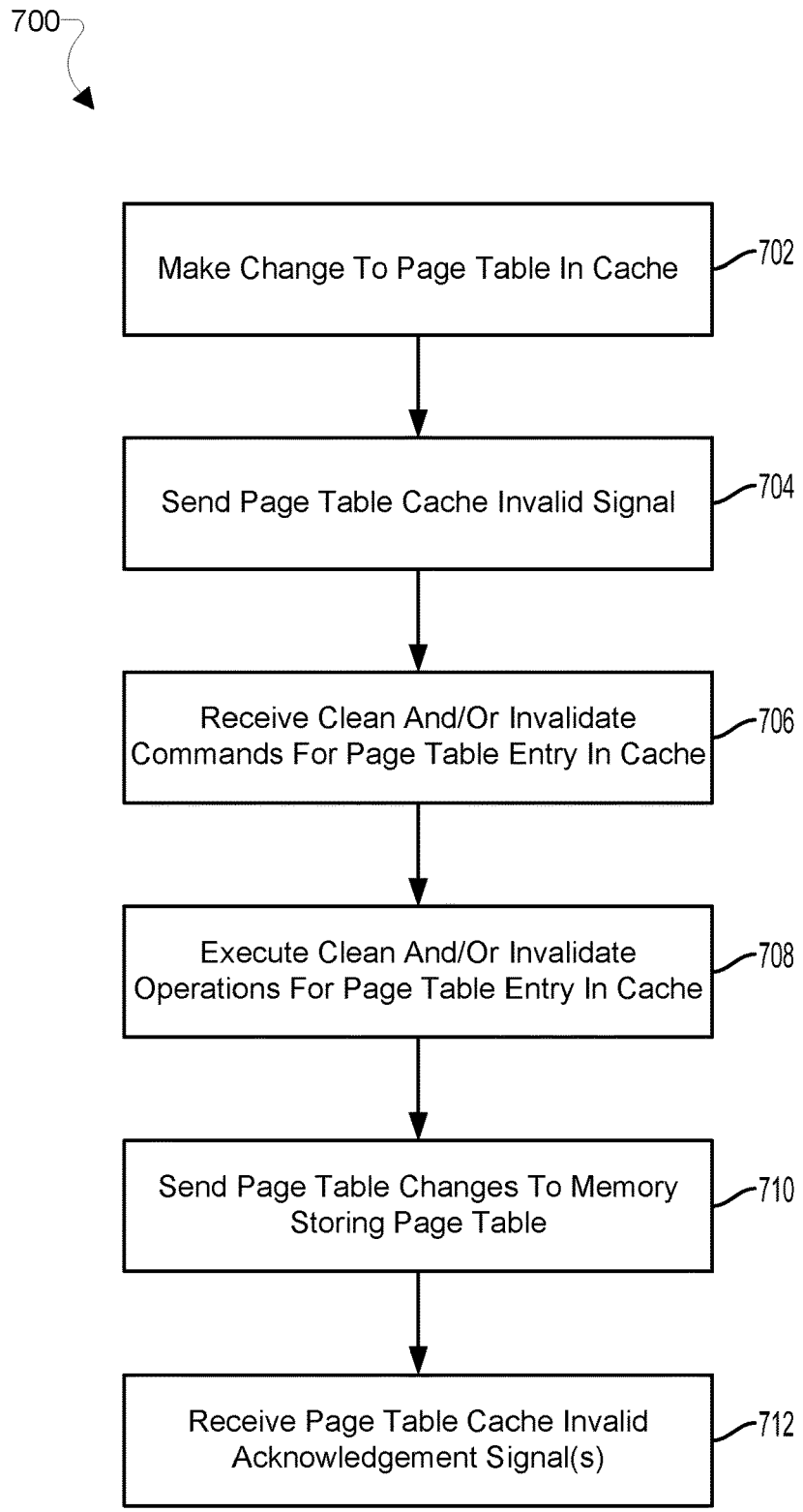
FIG. 7 is a process flow diagram illustrating a method for implementing automatic cache coherency for page table data according to an aspect.

FIG. 7 illustrates a method 700 for implementing automatic cache coherency for page table data according to an aspect. The method 700 may be implemented in a computing device in software executing in a processor (e.g., the processor 14 in FIGS. 1 and 2 and processing device 302 in FIGS. 3-6), in general purpose hardware, in dedicated hardware (e.g., page table coherency unit 314 and page table coherency unit MMU interface 314 in FIGS. 3-6), or in a combination of a software-configured processor and dedicated hardware, such as a processor executing software within a memory management system that includes other individual components (e.g., memory 16, 24 illustrated in FIG. 1, private cache 210, 212, 214, 216, and shared cache 230 illustrated in FIG. 2, shared memory 304 in FIGS. 3-6, and various memory/cache controllers (not shown). In order to encompass the alternative configurations enabled in the various aspects, the hardware implementing the method 700 is referred to herein as a "processing device." Further, portions of the methods 700, 800, and 900 in FIGS. 7, 8, and 9 may be implemented in response to and parallel with each other.

In block 702, the processing device may make a change to page table data stored in a cache associated with the processing device. The processing device may write to a cache location storing the page table data changing values that represent translations between virtual addresses understood by the processing device and physical addresses in any of various memories, including cache, main memory, and/or storage memory.

In block 704, the processing device may send a page table cache invalidate signal. The processing device may send the page table cache invalidate signal to various other processing devices associated with caches storing shared page table data. In various aspects, the processing device may send the page table cache invalidate signal to the other processing devices via a master SMMU (e.g., master SMMU 402 in FIGS. 4 and 6). The page table cache invalidate signal may signify that a change is made to the page table data stored in a cache associated with one of the processing devices. The processing device may include in the page table cache invalidate signal an identifier of which page table data has been changed in the cache and which page table data or a group page table data that needs to be updated by a receiving processing device.

In block 706, the processing device may receive a clean and/or invalidate cache maintenance command for its associated cache. The clean and/or invalidate cache maintenance command may specify a location in the cache at which the processing device made a change to the page table data stored in its associated cache in block 702. The location in the cache may be associated with a particular page table entry or entries.

In block 708, the processing device may execute the clean and/or invalidate cache maintenance command in its associated cache storing the page table data. The clean and/or invalidate cache maintenance command may be implemented for the cache location specified by the clean and/or invalidate cache maintenance command. The location in the cache may be associated with a particular page table entry or entries.

In block 710, the processing device may send the page table data at the location in the cache for which a change was made to the page table data to the shared memory for storing the page table data. The location of the cache storing the changed page table data that is sent to the shared memory may be specified in a clean cache maintenance command. As part of the clean cache maintenance command, a write command may be sent to the shared memory specifying to store the changed page table data to a location of the shared memory where the page table data was stored prior to being changed.

In block 712, the processing device may receive an acknowledgement of the page table cache invalidate signal sent in block 704. As discussed further herein, the acknowledgement of the page table cache invalidate signal may be received from various sources and in various forms, including individual acknowledgements from and for individual other processing devices, a single acknowledgement from an individual other processing device for multiple other individual processing devices, and multiple acknowledgements from an individual other processing device for multiple other individual processing devices. In various aspects, rather than receiving an acknowledgement of the page table cache invalidate in block 712, the processing device may send an explicit synchronization command to the various other processing devices associated with caches storing shared page table data. The processing device may execute the functions of blocks 702-710 any number of times before sending the explicit synchronization command.

Figure 8:
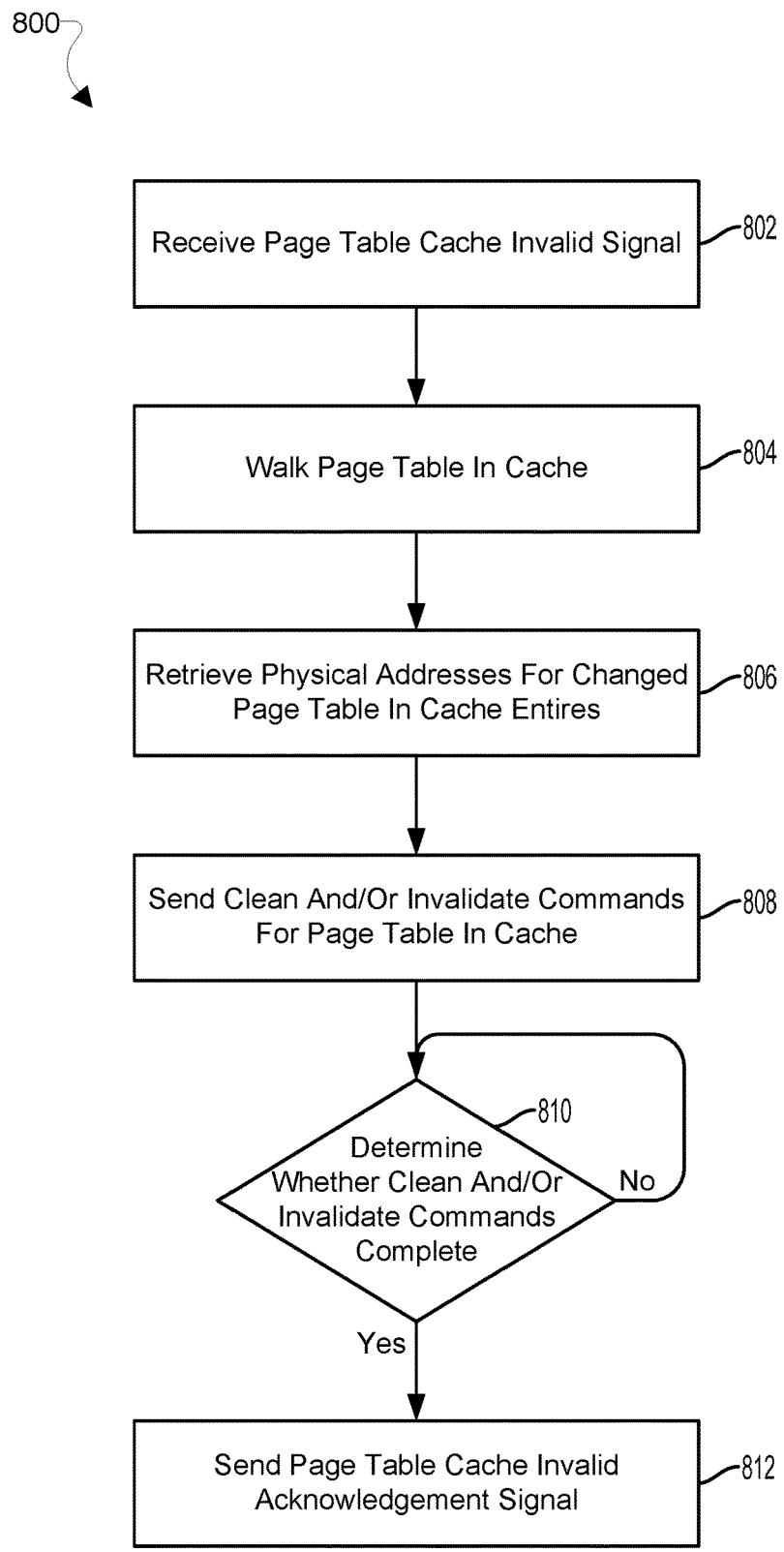
FIG. 8 is a process flow diagram illustrating a method for implementing automatic cache coherency for page table data according to an aspect.

FIG. 8 illustrates a method 800 for implementing automatic cache coherency for page table data according to an aspect. The method 800 may be implemented in a computing device in software executing in a processor (e.g., the processor 14 in FIGS. 1 and 2 and processing device 302 in FIGS. 3-6), in general purpose hardware, in dedicated hardware (e.g., page table coherency unit 314 and page table coherency unit MMU interface 314 in FIGS. 3-6), or in a combination of a software-configured processor and dedicated hardware, such as a processor executing software within a memory management system that includes other individual components (e.g., memory 16, 24 illustrated in FIG. 1, private cache 210, 212, 214, 216, and shared cache 230 illustrated in FIG. 2, shared memory 304 in FIGS. 3-6, and various memory/cache controllers (not shown). In order to encompass the alternative configurations enabled in the various aspects, the hardware implementing the method 800 is referred to herein as a "processing device." Further, portions of the methods 700, 800, and 900 in FIGS. 7, 8, and 9 may be implemented in response to and parallel with each other.

In block 802, the processing device may receive a page table cache invalidate signal. The page table cache invalidate signal may signify that a change is made to the page table data stored in a cache associated with the processing device that sent the signal. The page table cache invalidate signal may include an identifier of which page table data has been changed in the cache associated with the sending processing device.

In block 804, the processing device may walk the page table stored in the shared memory associated with the sending processing device. In various aspects, the processing device may execute the page table walk using values in the cache. In various aspects, the processing device may execute a target page table walk for locating addresses of the cache storing page table data identified by the page table cache invalidate signal as having been changed. In various aspects, the processing device may execute a page table walk for a section of the page table or a full page table walk for locating any addresses of the cache storing page table data exhibiting changes to the page table data. In various aspects, the processing device may have previously cached the page table data stored in the cache associated with the sending processing device and may compare the page table data to determine whether there are changes. In various aspects, the processing device may use coherent local data in its own cache to accelerate the page table walks. In various aspects, the processing device may identify markers in the stored page table data indicating changes to the stored page table data.

In block 806, the processing device may retrieve a physical address for the changed page table data stored in the cache associated with the sending processing device. The processing device may retrieve the physical address of the cache in response to locating a page table entry having changed page table data.

In block 808, the processing device may send a clean and/or invalidate cache maintenance command to the processing device associated with the cache storing the changed page table data. The clean and/or invalidate cache maintenance command may specify locations in the cache, such as virtual addresses that translate to the retrieved physical addresses of the cache, or the retrieved physical addresses of the cache themselves.

In determination block 810, the processing device may determine whether implementation of the clean and/or invalidate commands, sent in block 808, are complete. The processing device may determine completion of the implementation of the clean and/or invalidate commands by various means, including receiving a signal indicating the completion, waiting a designated period of time configured to be typically long enough for the implementation of the clean and/or invalidate commands to complete, and/or implementing a check of the status of the cache memory locations subject to the clean and/or invalidate commands.

In response to determining that implementations of the clean and/or invalidate commands are not complete (i.e., determination block 810="No"), the processing device may repeatedly determine whether the implementation of the clean and/or invalidate commands are complete in determination block 810.

In response to determining that implementations of the clean and/or invalidate commands are complete (i.e., determination block 810="Yes"), the processing device may send an acknowledgement of the page table cache invalidate signal in block 812.

Figure 9:
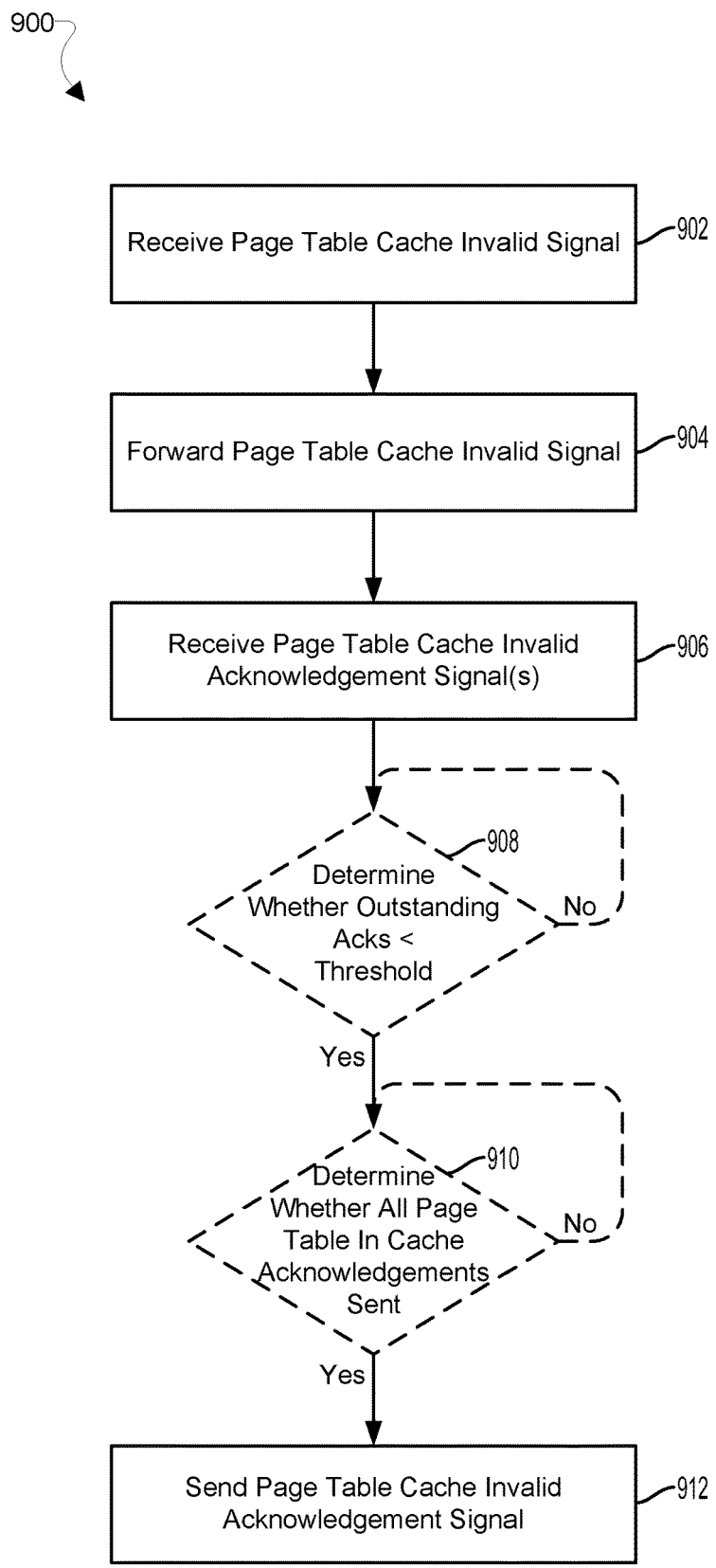
FIG. 9 is a process flow diagram illustrating a method for implementing automatic cache coherency for page table data according to an aspect.

FIG. 9 illustrates a method 900 for implementing automatic cache coherency for page table data according to an aspect. The method 900 may be implemented in a computing device in software executing in a processor (e.g., the processor 14 in FIGS. 1 and 2 and processing device 302 in FIGS. 3-6), in general purpose hardware, in dedicated hardware (e.g., page table coherency unit 314 and page table coherency unit MMU interface 314 in FIGS. 3-6, or a master SMMU 402 in FIGS. 4 and 6), or in a combination of a software-configured processor and dedicated hardware, such as a processor executing software within a memory management system that includes other individual components (e.g., memory 16, 24 illustrated in FIG. 1, private cache 210, 212, 214, 216, and shared cache 230 illustrated in FIG. 2, shared memory 304 in FIGS. 3-6, and various memory/cache controllers (not shown)). In order to encompass the alternative configurations enabled in the various aspects, the hardware implementing the method 900 is referred to herein as a "processing device." Further, portions of the methods 700, 800, and 900 in FIGS. 7, 8, and 9 may be implemented in response to and parallel with each other.

In block 902, the processing device may receive a page table cache invalidate signal. In various aspects, the processing device may receive a single page table cache invalidate signal. In various aspects, the single page table cache invalidate signal may include information indicating the processing devices to which the page table cache invalidate signal is to be delivered. In various aspects, the processing device may receive multiple page table cache invalidate signals. In various aspects, each of the page table cache invalidate signals may include information indicating the processing device(s) to which the individual page table cache invalidate signal is to be delivered.

In block 904, the processing device may forward the page table cache invalidate signal(s) to any number of other processing devices communicatively connected to the processing device. In various aspects, the processing device may direct the page table cache invalidate signal(s) to all of the other processing devices communicatively connected to the processing device, to the processing devices indicated by the page table cache invalidate signal(s), or to any other processing device that may indicate (actively or passively) to the processing device that their associated cache is storing page table data relevant to the page table cache invalidate signal(s). In various aspects, a page table cache invalidate signal may be duplicated by the processing device to disseminate the page table cache invalidate signal to multiple other processing devices. In various aspects, a page table cache invalidate signal may be directed to one other processing device by the processing device with instructions to pass the page table cache invalidate signal to other processing devices.

In block 906, the processing device may receive an acknowledgement of the page table cache invalidate signal. In various aspects, the processing device may receive an acknowledgement of the page table cache invalidate signal from each of the other processing devices to which the processing device forwarded the page table cache invalidate signal.

In optional determination block 908, the processing device may determine whether the clean and/or invalidate cache maintenance operations for the cache storing the changed page table data are complete. To determine whether the cache maintenance operations are complete, the processing device may check a state of the sending processing device and/or its memory management unit, check for access to the shared memory, and/or check page table data in the shared memory of the changes.

In response to determining that the clean and/or invalidate cache maintenance operations for the cache storing the changed page table data are not complete (i.e., optional determination block 908="No"), the processing device may repeatedly determine whether the clean and/or invalidate cache maintenance operations for the cache storing the changed page table data are complete in determination block 908.

In response to determining that the clean and/or invalidate cache maintenance operations for the cache storing the changed page table data are complete (i.e., optional determination block 908="Yes"), the processing device may determine whether all page table in cache acknowledgements ("acks") have been sent in optional determination block 910. In some aspects, this determination may involve determining whether the number of outstanding of the page table cache invalidate signals sent is less than (or equal to in various aspects) a threshold. In various aspects, the processing device may be configured to recognize the number of processing devices having the shared page table data stored in an associated cache. In various aspects, the processing device may be configured to recognize from information in or from the distribution of the page table cache invalidate signal the number of processing devices to which the signal was sent. In these aspects, the processing device may be able to count the number of sent acknowledgements sent and compare the numbers to determine the number of outstanding acknowledgements. In various aspects, the processing device may be configured to read an indicator, such as a register, used by the sending processing device to count the number of outstanding acknowledgements. The processing device may compare the number of outstanding acknowledgements to the threshold to determine whether the threshold is exceeded. In various aspects, the threshold may be configured to indicate that only the processing device's acknowledgement is outstanding.

In response to determining that not all page table in cache acknowledgements have been sent (e.g., the number of outstanding acknowledgements of the page table cache invalidate signals sent is greater than, or equal to in various aspects, the threshold) (i.e., optional determination block 910="No"), the processing device may repeatedly determine whether all page table in cache acknowledgements have been sent in determination block 910.

In response to determining that all page table in cache acknowledgements have been sent (e.g., the number of outstanding acknowledgements of the page table cache invalidate signals sent is less than, or equal to in various aspects, the threshold) (i.e., optional determination block 910="Yes"), the processing device may send an acknowledgement of the page table cache invalidate signal to a processing device that sent the page table cache invalidate signal in block 912. In various aspects, the processing device may send each acknowledgement of the page table cache invalidate signal received from the other processing devices. In various aspects, the processing device may send the acknowledgements of the page table cache invalidate signal based on various criteria, including as they are received, periodically, or based on a number of acknowledgement of the page table cache invalidate signal received. In various aspects, the processing device may send an acknowledgement of the page table cache invalidate signal representing any number of acknowledgements of the page table cache invalidate signal received from the other processing devices. This combined acknowledgement of the page table cache invalidate signal may include information indicating the number and/or the other processing devices that the combined acknowledgement of the page table cache invalidate signal represents.

Figure 10:
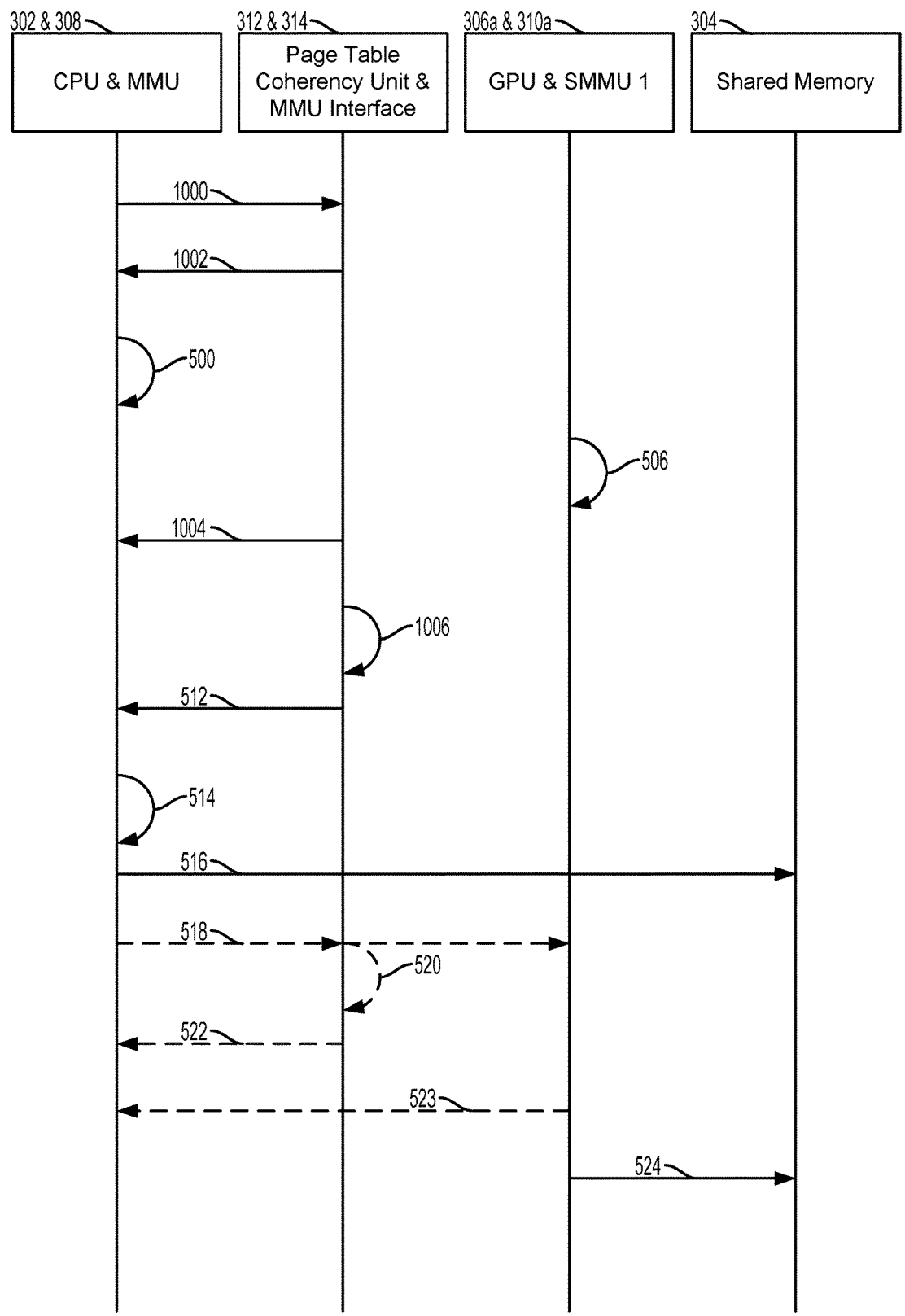
FIG. 10 is a component interaction flow diagram illustrating an example of an operation flow for automatic cache coherency for page table data using a page table coherency unit having a fully coherent port for implementing an aspect.

FIG. 10 illustrates an example of an operation flow for automatic cache coherency for page table data using a page table coherency unit having a fully coherent port implementing an aspect. The example illustrated in FIG. 10 relates to the structure of the heterogeneous computing device 300 illustrated in FIG. 3. The CPU 302, the memory management unit (MMU) 308, the GPU 306a, and the SMMU 310a (SMMU 1) are used as examples for ease of explanation and brevity, but are not meant to limit the number and/or types of processing devices (e.g., processor 14 in FIGS. 1 and 2, and processing devices 302, 306a, 306b, 306c in FIGS. 3 and 4. Further the order of the operations and signals 500, 502, 506, 508, 512-524, and 1000-1006 is used as an example for ease of explanation and brevity, but is not meant to limit the possible order of execution of the operations and signals 500, 502, 506, 508, 512-524, and 1000-1006 as various of the operations and signals 500, 502, 506, 508, 512-524, and 1000-1006 may be implemented in parallel and in other orders. Also for brevity and ease of explanation the operations and signals 500, 502, 506, 508, 512-524 in the example illustrated in FIG. 10 may be implemented in similar manners as to the descriptions of operations and signals 500, 502, 506, 508, 512-524 illustrated in FIG. 5.

The CPU 302 and/or the memory management unit 308 may submit 1000, to the page table coherency unit 312, address ranges of cache associated with the CPU 302 at which stage 2 translation page table data is stored. The page table coherency unit 312 may store the information of the address ranges associated with the CPU 302, the memory management unit 308, and/or the cache associated with the CPU 302. The page table coherency unit 312 and/or the page table coherency unit MMU interface 314 may listen 1002 for write operations by the CPU 302 and/or the memory management unit 308 to the cache associated with the CPU 302 in the stored address range. Listening for the write operations may be implemented using a fully coherent port of the page table coherency unit 312. The page table coherency unit 312 and/or the page table coherency unit MMU interface 314 may detect write operations from to the cache associated with the CPU 302, identify the destination address for the write operation from the access to the cache, and compare the destination address with the stored addresses. When the write operation address is in the range of the stored addresses, the page table coherency unit 312 and/or the page table coherency unit MMU interface 314 may respond as described herein.

The CPU 302 and/or the memory management unit 308 may make a change 500 to the page table data stored in the cache associated with the CPU 302. The GPU 306a and the SMMU 310a may implement 506 a page table cache invalidate for the page table data stored in a cache associated with the GPU 306a.

The page table coherency unit 312 and/or the page table coherency unit MMU interface 314 may identify 1004 write operations by the CPU 302 and/or the memory management unit 308 to the cache associated with the CPU 302 in the stored address range. In response to identifying the write operations, the page table coherency unit 312 and/or the page table coherency unit MMU interface 314 may wait 1006 for a designated period. The period may be configured to be long enough to provide time for the CPU 302 and/or the memory management unit 308 to do additional work with the modified data in the cache while retaining the benefits of the data being in the cache in a dirty state following the write operation of the operation 1000, send a page table cache invalidate signal to the GPU 306a and/or the SMMU 310a, as the operation 502, and/or implement the clean and/or invalidate cache maintenance operation, as the operation 514. The delay may be implemented using a first-in first-out (FIFO) queue, a timer, a counter, or some other mechanism.

The page table coherency unit 312 and/or the page table coherency unit MMU interface 314 may issue 512 a clean and/or invalidate cache maintenance command to the CPU 302 for the location in the cache of the modified page table data, and the CPU 302 and the memory management unit 308 may implement 514 the clean and/or invalidate cache maintenance operation. The CPU 302 and the memory management unit 308 implementing the clean cache maintenance operation may write 516 the modified page table data to the page table stored in the shared memory 304.

In various aspects, synchronization with the CPU associated cache may be implemented in various manners. In various optional aspects, the CPU 302 and/or the memory management unit 308 may issue 518 an explicit command to an SMMU and/or the page table coherency device MMU interface 314 to prompt synchronization operations. In various optional aspects, the page table coherency device 312 and/or the page table coherency device MMU interface 314 may wait 520 for a designated period prior to implementing a synchronization operation. The page table coherency device 312 and/or the page table coherency device MMU interface 314 may send 522 an acknowledgement of the page table cache invalidate signal to the CPU 302. In various optional aspects, the page table coherency device 312 and/or the page table coherency device MMU interface 314 and/or the GPU 306a and/or the SMMU 310a may send may send 523 an acknowledgement to the CPU 302 in response to the explicit command from the CPU 302 and/or the memory management unit 308, and/or a lapse of the designated period. The GPU 302 may access 524 valid page tables in the shared memory 304.

Figure 11:
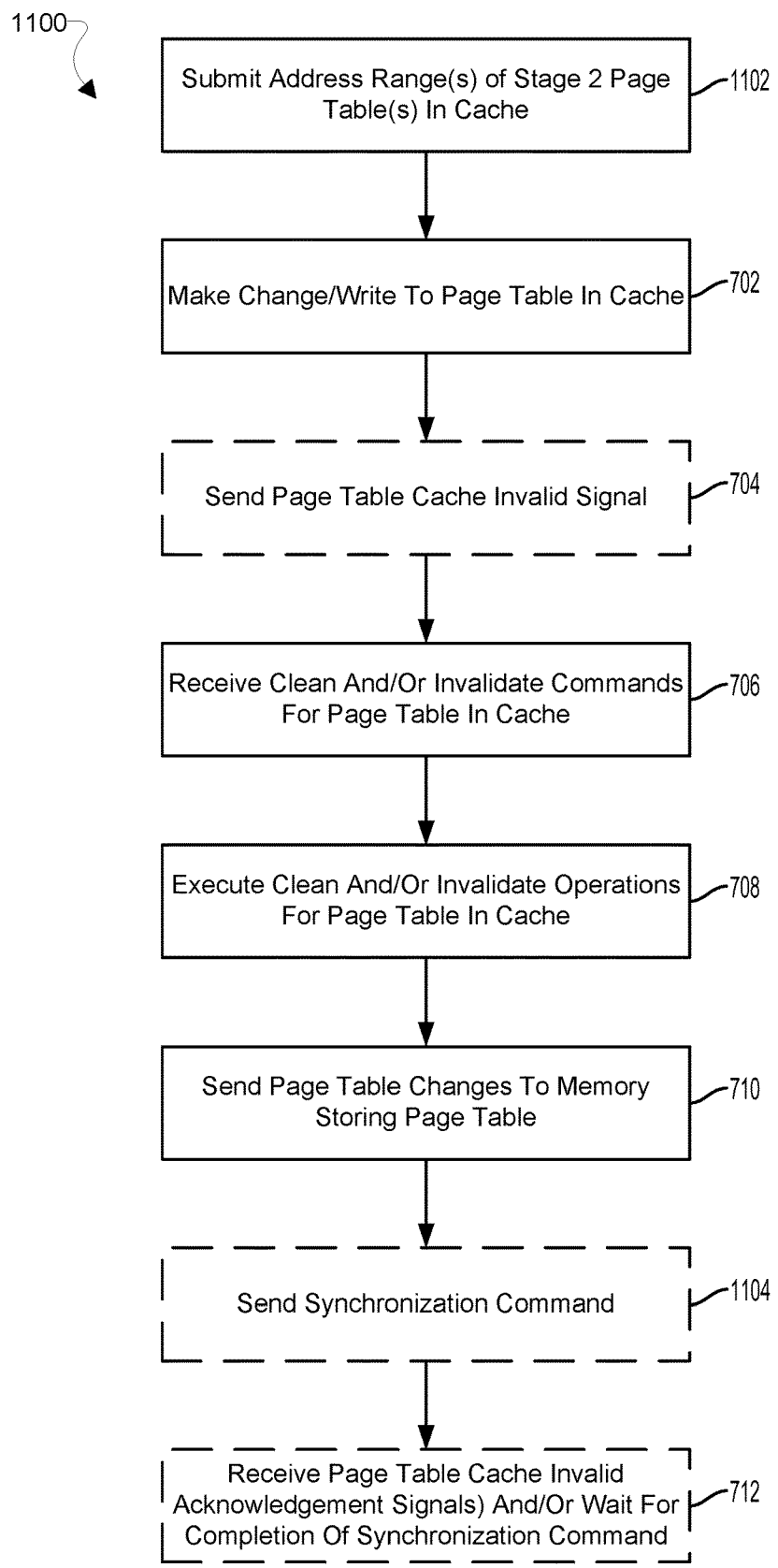
FIG. 11 is a process flow diagram illustrating a method for implementing automatic cache coherency for page table data using protected memory ranges according to an aspect.

FIG. 11 illustrates a method 1100 for implementing automatic cache coherency for page table data using protected memory ranges according to an aspect. The method 1100 may be implemented in a computing device in software executing in a processor (e.g., the processor 14 in FIGS. 1 and 2 and processing device 302 in FIGS. 3-6 and 10), in general purpose hardware, in dedicated hardware (e.g., page table coherency unit 314 and page table coherency unit MMU interface 314 in FIGS. 3-6 and 10), or in a combination of a software-configured processor and dedicated hardware, such as a processor executing software within a memory management system that includes other individual components (e.g., memory 16, 24 illustrated in FIG. 1, private cache 210, 212, 214, 216, and shared cache 230 illustrated in FIG. 2, shared memory 304 in FIGS. 3-6 and 10, and various memory/cache controllers (not shown). In order to encompass the alternative configurations enabled in the various aspects, the hardware implementing the method 1100 is referred to herein as a "processing device." Blocks 702-710 and 712 may be implemented as described in reference to blocks 702-710 and 712 of the method 700 illustrated in FIG. 7. Further, portions of the methods 1100 and 1200 in FIGS. 11 and 12 may be implemented in response to and parallel with each other.

In block 1102, the processing device may submit an address range of a cache for a stage two address translation page table for storage and use by another processing device, such as the page table coherency unit. In various aspects, the address range may include physical or virtual addresses of the cache. The address range may be for the cache associated with the processing device.

In block 702, the processing device may make a change to page table data stored in a cache associated with the processing device.

In optional block 704, the processing device may send a page table cache invalidate signal.

In block 706, the processing device may receive a clean and/or invalidate cache maintenance command for its associated cache, particularly for the submitted address range of the cache in which the page table data was modified.

In block 708, the processing device may execute the clean and/or invalidate cache maintenance command in its associated cache storing the page table data, particularly for the submitted address range of the cache in which the page table data was modified.

In block 710, the processing device may send the page table data at the location in the cache for which a change was made to the page table data to the shared memory for storing the page table data.

In optional block 1104, the processing device may send an explicit command to instruct memory management devices of other processing devices to execute synchronization protocols for the shared page table data stored in the caches of the respective processing devices. The explicit command may include the page table cache invalidate signal and/or a separate signal. The processing device may execute the functions of block 1102 and 702-710 any number of times before sending the explicit synchronization command in block 1104.

In optional block 712, the processing device may receive an acknowledgement of the page table cache invalidate signal sent in optional block 704. In various aspects, the processing device may wait for completion of the explicit synchronization command by the other processing devices.

Synchronization of the shared page data may be implemented for the method 1100 in various ways. In an aspect, optional blocks 704 and 712 may be implemented for synchronization using page table cache invalidate signals. This technique for implementing synchronization prompts invalidating the shared page table data in a cache so that next time the page table data is needed, a miss occurs in the cache and the updated shared page table data is retrieved from the shared memory. In an aspect, optional block 1104 may be implemented sending an explicit synchronization signal after the update of the shared page table data in the shared memory to prompt other processing devices to update their copies of the shared page table data in their associated caches with the updated shared page table data in the shared memory. In an aspect, optional block 704 may be implemented without optional block 712. The page table cache invalidate signals may be configured to prompt the receiving other processing devices to synchronize the shared page table data in their associated caches after and elapsed period from receiving the signal. The period may be, for example, a known amount of time for the processing device to implement the cache maintenance operations.

Figure 12:
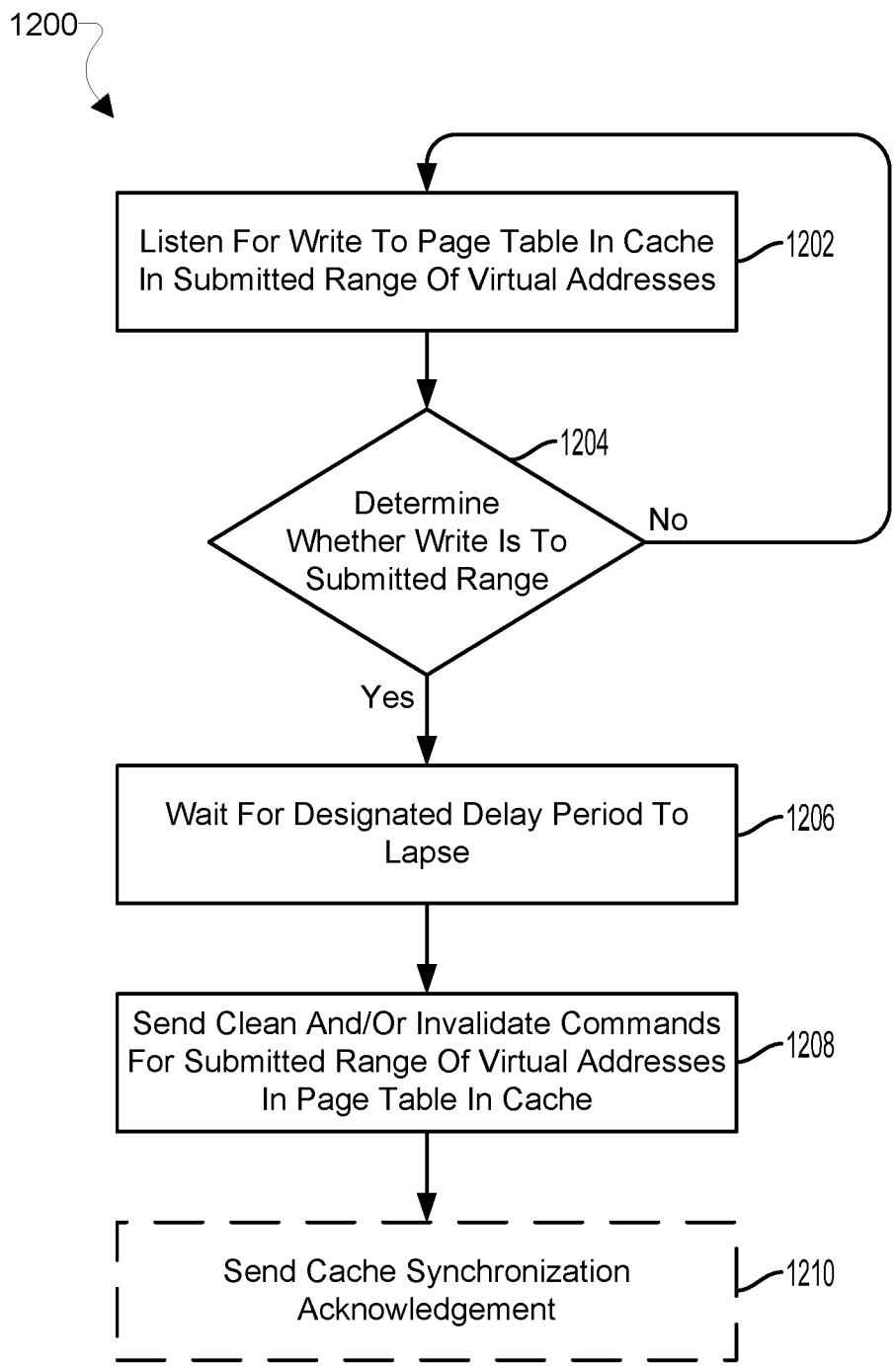
FIG. 12 is a process flow diagram illustrating a method for implementing automatic cache coherency for page table data using protected memory ranges according to an aspect.

FIG. 12 illustrates a method 1200 for implementing automatic cache coherency for page table data using protected memory ranges according to an aspect. The method 1200 may be implemented in a computing device in software executing in a processor (e.g., the processor 14 in FIGS. 1 and 2 and processing device 302 in FIGS. 3-6 and 10, in general purpose hardware, in dedicated hardware (e.g., page table coherency unit 314 and page table coherency unit MMU interface 314 in FIGS. 3-6 and 10), or in a combination of a software-configured processor and dedicated hardware, such as a processor executing software within a memory management system that includes other individual components (e.g., memory 16, 24 illustrated in FIG. 1, private cache 210, 212, 214, 216, and shared cache 230 illustrated in FIG. 2, shared memory 304 in FIGS. 3-6 and 10, and various memory/cache controllers (not shown). In order to encompass the alternative configurations enabled in the various aspects, the hardware implementing the method 1200 is referred to herein as a "processing device." Further, portions of the methods 1100 and 1200 in FIGS. 11 and 12 may be implemented in response to and parallel with each other.

In block 1202, the processing device may listen for a write command for page table data stored in a cache in a submitted range of addresses. The cache may be associated with another processing device that submitted the range of addresses for storage and use by the processing device. The processing device may monitor the activity of the other processing device in the submitted address range, particularly for activity that may change the contents of the data stored in the submitted address range. In various aspects, in block 1202, the processing device may also listen for a synchronization signal from the processing device associated with the cache. The processing device may stop monitoring the submitted range of addresses when the synchronization signal is received, or continue monitoring but not add new addresses to its synchronization evaluation. In various aspects, in a first-in first-out (FIFO) queue and/or scheme, new entries could be marked as not needing execution to respond to the current synchronization signal. In various aspects, the synchronization signal could be a special entry in the FIFO queue.

In determination block 1204, the processing device may determine whether a write command is issued for the submitted range of addresses. The processing device may use a fully coherent port to listen to the traffic to from the other processing device and/or to the cache associated with the other processing device. The processing device may identify write commands and the target address of the write commands from their accesses to the cache. The processing device may compare the target address of the write commands with the submitted range of addresses for the cache to determine whether the write command is targeted for an address in the submitted range of addresses.

In response to determining that the write command is not issued for the submitted range of addresses (i.e., determination block 1204="No"), the processing device may continue to listen for a write command for page table data stored in a cache in a submitted range of addresses in block 1202.

In response to determining that the write command is issued for the submitted range of addresses (i.e., determination block 1204="Yes"), the processing device may wait for a designated period to lapse in block 1206. The period may be configured to be long enough to provide time to do additional work with the modified data in the cache by the processing device associated with the cache while retaining the benefits of the data being in the cache in a dirty state, and/or send a page table cache invalidate signal to another processing device, as in block 704 of the method 1100 illustrated in FIG. 11.

In block 1208, the processing device may send a clean and/or invalidate cache maintenance command for the submitted range of addresses of the cache storing the page table data in which the other processing device executed the write operation.

In optional block 1210, the processing device may send an acknowledgement for the cache synchronization mechanism implemented by the other processing device. For example, the processing device may respond to an explicit synchronization command or a page table cache invalidate signal with an acknowledgment signal. In other examples, the processing device may send an acknowledgement for a lapsed time period of the processing device to synchronize the page table data stored in its associated cache. How the sending of the acknowledgement is implemented may correspond with which of optional blocks 704, 712, and 1104 are implemented in the method 1100 described with reference to FIG. 11.

Figure 13:
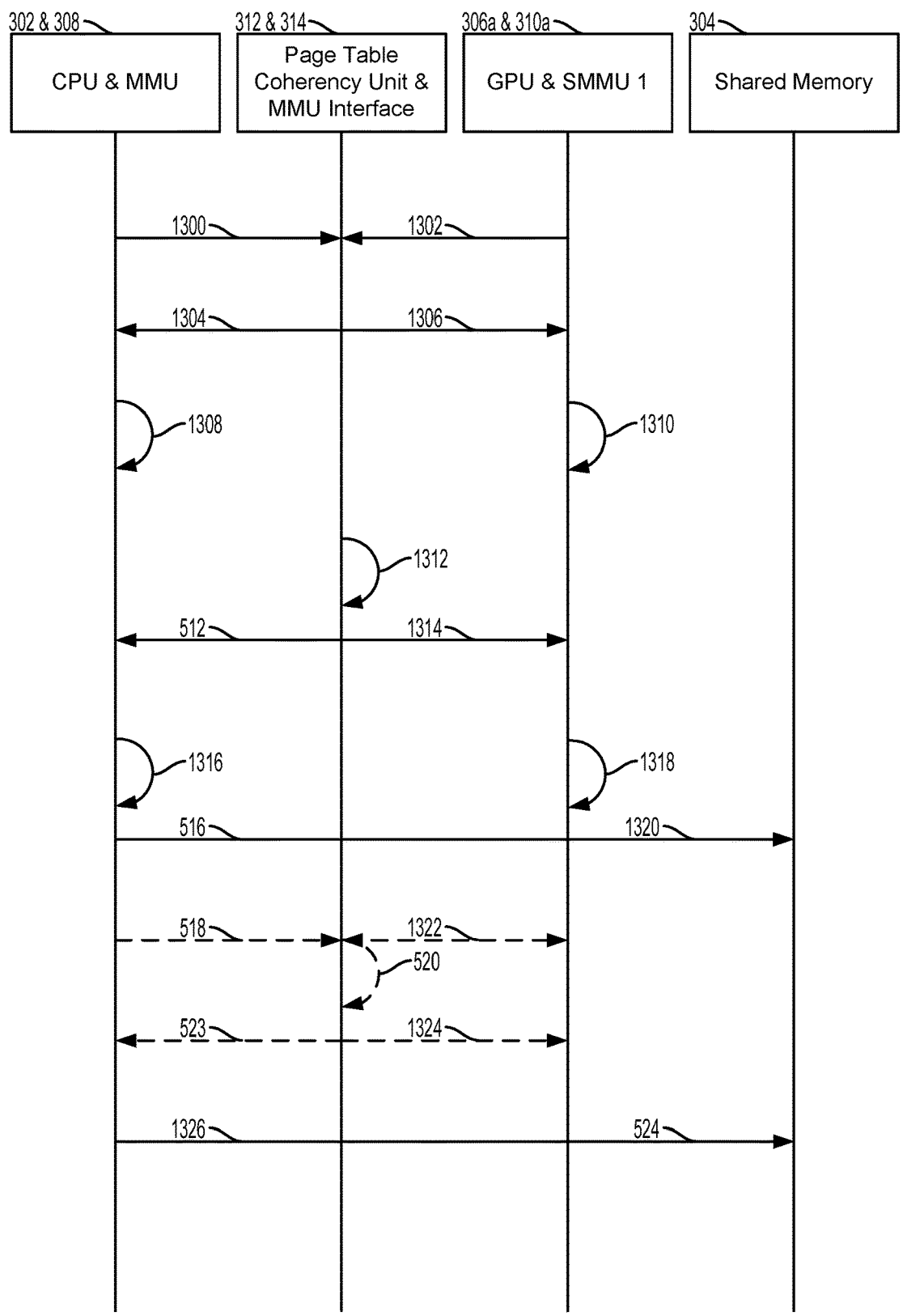
FIG. 13 is a component interaction flow diagram illustrating an example of an operation flow for automatic cache coherency for page table data using a page table coherency unit using signals including virtual addresses and address space identifiers for implementing an aspect.

FIG. 13 illustrates an example of an operation flow for automatic cache coherency for data, including page table data, using a page table coherency unit using a page table coherency unit using signals including virtual addresses and address space identifiers implementing an aspect. The example illustrated in FIG. 13 relates to the structure of the heterogeneous computing device 300 illustrated in FIG. 3. The CPU 302, the memory management unit (MMU) 308, the GPU 306*a*, and the SMMU 310*a* (SMMU 1) are used as examples for ease of explanation and brevity, but are not meant to limit the number and/or types of processing devices (e.g., processor 14 in FIGS. 1 and 2, and processing devices 302, 306*a*, 306*b*, 306*c* in FIGS. 3 and 4. Further the order of the operations 512, 516-520, 523, 524, and 1300-1322 is an example for ease of explanation and brevity, but is not meant to limit the possible order of execution of the operations 512, 516-520, 523, 524, and 1300-1322 as several of the operations 512, 516-520, 523, 524, and 1300-1322 may be implemented in parallel and in other orders. Also for brevity and ease of explanation the operations 512 and 516-520, 523, 524 in the example illustrated in FIG. 13 may be implemented in a manner similar to the descriptions of the operations 512 and 516-520, 523, 524 described with reference to FIG. 5. The various aspects described herein with respect to page table data stored in a cache may be similarly applied for any data stored in the cache.

The CPU 302 and/or the memory management unit 308 may reserve 1300 a range of virtual addresses and address space identifiers of their associated cache with the page table coherency unit 312. Similarly, the GPU 306*a* and/or the SMMU 310*a* may reserve 1302 a range of virtual addresses and address space identifiers of their associated cache with the page table coherency unit 312. While the virtual addresses and address space identifiers are reserved with the page table coherency unit 312, in various aspects, the virtual addresses and address space identifiers may be for any buffer allocated in the associated caches, and is not limited to buffers for storing the page table data in cache. The page table coherency unit 314 and/or the page table coherency unit MMU interface 314 may monitor 1304, via a fully coherent port, write operations to the cache associated with the CPU 302. Similarly, the page table coherency unit 314 and/or the page table coherency unit MMU interface 314 may monitor 1306, via the fully coherent port, write operations to the cache associated with the GPU 306*a*. The CPU 302 and/or the memory management unit 308 may make a change 1308 to data of the reserved virtual address range and address space identifier in an associated cache. Similarly, the GPU 306*a* and/or the SMMU 310*a* may make a change 1310 to data of the reserved virtual address range and address space identifier in an associated cache.

The page table coherency unit 314 and/or the page table coherency unit MMU interface 314 may identify 1312 a write to a cache, extract identifying information from the write command, including a virtual address, an address space identifier, and/or other identifying information, including a physical address, of the cache for which the write command is targeted. The page table coherency unit 314 and/or the page table coherency unit MMU interface 314 may compare the extracted identifying information with the identifying information of the reserved cache associated with either the CPU 302 or the GPU 306*a*. In response to the page table coherency unit 312 and/or the page table coherency unit MMU interface 314 determining the write command is for a reserved portion of the associated cache of the CPU 302, the page table coherency unit 312 and/or the page table coherency unit MMU interface 314 may issue 512 a clean and/or invalidate cache maintenance command to the CPU 302 for the location in the cache modified by the write command. Similarly, in response to the page table coherency unit 312 and/or the page table coherency unit MMU interface 314 determining the write command is for a reserved portion of the associated cache of the GPU 306*a*, the page table coherency unit 312 and/or the page table coherency unit MMU interface 314 may issue 1314 a clean and/or invalidate cache maintenance command to the GPU 306*a* for the location in the cache modified by the write command.

The CPU 302 and/or the memory management unit 308 may implement 1316 the cache maintenance command for the address range and address space identifier storing the data modified by the write command. Similarly, the GPU 306*a* and/or the SMMU 310*a* may implement 1318 the cache maintenance command for the address range and address space identifier storing the data modified by the write command. The CPU 302 and the memory management unit 308 implementing the clean cache maintenance operation may write 516 the modified data to the shared memory 304. Similarly, the GPU 306*a* and/or the SMMU 310*a* implementing the clean cache maintenance operation may write 1320 the modified data to the shared memory 304. The modification to the data being written to and stored in the shared memory 304 makes the modified data available to other processing devices for use in updating the data stored in the respective associated caches to keep the data coherent across processing devices.

The CPU 302 and/or the memory management unit 308 may issue 518 an explicit command to an SMMU, including SMMU 310*a*, and/or the page table coherency device MMU interface 314 to prompt synchronization operations. Similarly, the GPU 306*a* and/or the SMMU 310*a* may issue 1322 an explicit command to an SMMU and/or the page table coherency device MMU interface 314 to prompt synchronization operations. The page table coherency device 312 and/or the page table coherency device MMU interface 314 may wait 520 for a designated period prior to implementing a synchronization operation. The page table coherency device 312 and/or the page table coherency device MMU interface 314 may send 523 an acknowledgement of the synchronization command to the CPU 302. Similarly, the page table coherency device 312 and/or the page table coherency device MMU interface 314 may send 1324 an acknowledgement of the synchronization command to the GPU 306*a*.

The CPU 302 may access 1326 valid data in the shared memory 304. Similarly, the GPU 306a may access 524 valid data in the shared memory 304.

Figure 14:
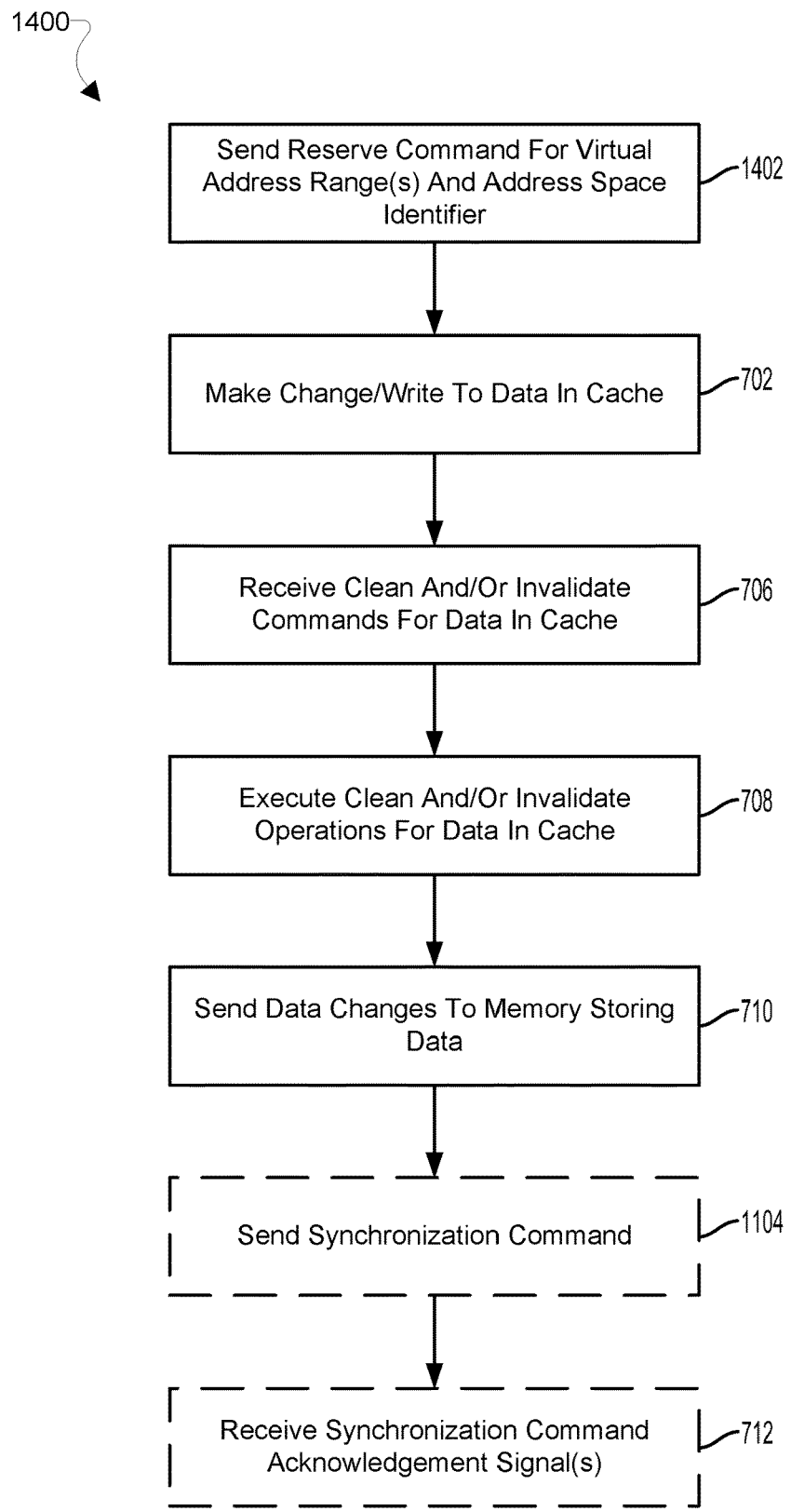
FIG. 14 is a process flow diagram illustrating a method for implementing automatic cache coherency for page table data using signals including virtual addresses and address space identifiers according to an aspect.

FIG. 14 illustrates a method 1400 for implementing automatic cache coherency for data, including page table data, using signals including virtual addresses and address space identifiers according to an aspect. The method 1400 may be implemented in a computing device in software executing in a processor (e.g., the processor 14 in FIGS. 1 and 2 and processing device 302 in FIGS. 3-6 and 13), in general purpose hardware, in dedicated hardware (e.g., page table coherency unit 314 and page table coherency unit MMU interface 314 in FIGS. 3-6 and 13), or in a combination of a software-configured processor and dedicated hardware, such as a processor executing software within a memory management system that includes other individual components (e.g., memory 16, 24 illustrated in FIG. 1, private cache 210, 212, 214, 216, and shared cache 230 illustrated in FIG. 2, shared memory 304 in FIGS. 3-6 and 13, and various memory/cache controllers (not shown). In order to encompass the alternative configurations enabled in the various aspects, the hardware implementing the method 1100 is referred to herein as a "processing device." Blocks 702, 706-710, and 712 may be implemented as described with reference to blocks 702, 706-710, and 712 of the method 700 illustrated in FIG. 7. Further, portions of the methods 1400 and 1500 illustrated in FIGS. 14 and 15 may be implemented in response to and parallel with each other. The various aspects described herein with respect to page table data stored in a cache may be similarly applied for any data stored in the cache.

In block 1402, the processing device may send a reserve command to the page table coherency unit identifying a range of virtual addresses, an address space identifier, and/or other identifying information, such as physical addresses, of a cache associated with the processing device to reserve the areas of cache corresponding to the range of virtual addresses, an address space identifier, and/or other identifying information. In various aspects, the virtual addresses and address space identifiers may be for any buffer allocated in the associated caches, and is not limited to buffers for storing the page table data in cache.

In block 702, the processing device may make a change to data stored in a cache associated with the processing device.

In block 706, the processing device may receive a clean and/or invalidate cache maintenance command for its associated cache, and particularly for the reserved portion of cache in which the change to the data was made.

In block 708, the processing device may execute the clean and/or invalidate cache maintenance command in its associated cache storing the modified data, particularly for the reserved areas of the cache.

In block 710, the processing device may send the modified data in the reserved portion of the cache for which a change was made to the data to the shared memory for storing the data.

In optional block 1104, the processing device may send an explicit synchronization command to instruct memory management devices of other processing devices to execute synchronization protocols for the shared data stored in the caches of the respective processing devices.

In optional block 712, the processing device may receive an acknowledgement of the synchronization command signal sent in optional block 1104.

Figure 15:
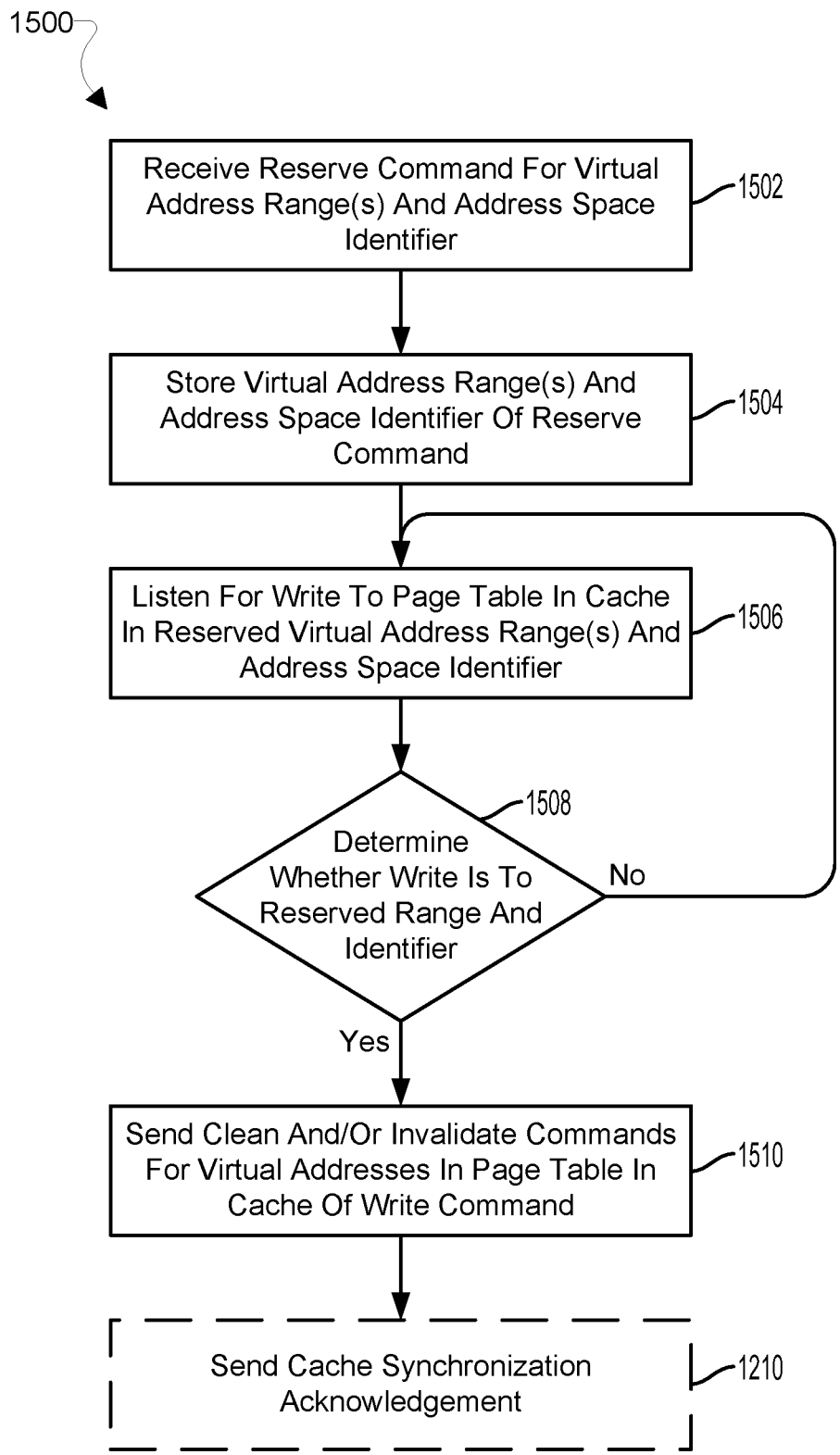
FIG. 15 is a process flow diagram illustrating a method for implementing automatic cache coherency for page table data using signals including virtual addresses and address space identifiers according to an aspect.

FIG. 15 illustrates a method 1500 for implementing automatic cache coherency for data, including page table data, using signals including virtual addresses and address space identifiers according to an aspect. The method 1500 may be implemented in a computing device in software executing in a processor (e.g., the processor 14 in FIGS. 1 and 2 and processing device 302 in FIGS. 3-6 and 13, in general purpose hardware, in dedicated hardware (e.g., page table coherency unit 314 and page table coherency unit MMU interface 314 in FIGS. 3-6 and 13), or in a combination of a software-configured processor and dedicated hardware, such as a processor executing software within a memory management system that includes other individual components (e.g., memory 16, 24 illustrated in FIG. 1, private cache 210, 212, 214, 216, and shared cache 230 illustrated in FIG. 2, shared memory 304 in FIGS. 3-6 and 13, and various memory/cache controllers (not shown). In order to encompass the alternative configurations enabled in the various aspects, the hardware implementing the method 1500 is referred to herein as a "processing device." Further, portions of the methods 1400 and 1500 illustrated in FIGS. 14 and 15 may be implemented in response to and parallel with each other. The various aspects described herein with respect to page table data stored in a cache may be similarly applied for any data stored in the cache.

In block 1502, the processing device may receive a reserve command for a range of virtual addresses, address space identifiers, and/or other identifying information, such as physical addresses, of the associated cache of another processing device. The reserve command may be made so that the processing device may recognize a reserved area in the associated cache for which if a modification is made to the stored data therein, the processing device may implement coherency mechanisms for the modified cached data. In various aspects, in block 1502, the processing device may also listen for a synchronization signal from the processing device associated with the cache. The processing device may stop monitoring reserved cache locations when the synchronization signal is received, or continue monitoring but not add new addresses to its synchronization evaluation. In various aspects, in a FIFO queue and/or scheme, new entries could be marked as not needing execution to respond to the current synchronization signal. In various aspects, the synchronization signal could be a special entry in the FIFO queue. In various aspects, the processing device may receive an unreserve command for a range of virtual addresses, address space identifiers, and/or other identifying information. The unreserved command may be configured for removing a reserved designation, as discussed herein, from cache locations specified by the range of virtual addresses, address space identifiers, and/or other identifying information.

In block 1504, the processing device may store the range of virtual addresses, address space identifiers, and/or other identifying information of the cache associated with the other processing device that made the reserve command based on the identifying information provided with the reserve command. In various aspects, the processing device may maintain, in a cache associated with processing device, the range of virtual addresses, address space identifiers, and/or other identifying information as reserved cache locations associated with the other processing device. In various aspects, labeling the range of virtual addresses, address space identifiers, and/or other identifying information as reserved may not affect the operation of the reserved cache.

In block 1506, the processing device may listen for write commands to the reserved areas of cache. In various aspects, the processing device may include a fully coherent port that may allow the processing device to monitor the access requests to the caches. The write access requests may include identifying information for the target of the write command, including some or all of the types of identifying information used by the processing device to define a reserved portion of the cache, such as virtual addresses, address space identifiers, and other identifying information.

In determination block 1508, the processing device may determine whether the write command targets a reserved area of a cache. The processing device may compare the identifying information for the target of the write command from the write command and the reserved areas of a cache. Like types of data may be compared to determine whether the values are the same and/or whether some of the write command target values are within a range of values reserved in the cache.

In response to determining that the write command does not target a reserved area of a cache (i.e., determination block 1508="No"), the processing device may continue to listen for write commands to the reserved areas of cache in block 1506.

In response to determining that the write command does target a reserved area of a cache (i.e., determination block 1508="Yes"), the processing device may send a clean and/or invalidate command to the other processing device associated with the cache targeted by the write command, for which the cache maintenance operations may be particularly for the reserved areas of the cache, in block 1510.

In optional block 1210, the processing device may send an acknowledgement for the cache synchronization mechanism implemented by the other processing device. For example, the processing device may respond to an explicit synchronization command or a page table cache invalidate signal with an acknowledgment signal. In other examples, the processing device may send an acknowledgement for a lapsed time period of the processing device to synchronize the page table data stored in its associated cache. In various aspects, the time period may be tracked by the other processing device, and an acknowledgement may not be needed. How the sending of the acknowledgement is implemented may correspond with which of optional blocks 712 and 1104 are implemented in the method 1400 illustrated in FIG. 14.

Figure 16:
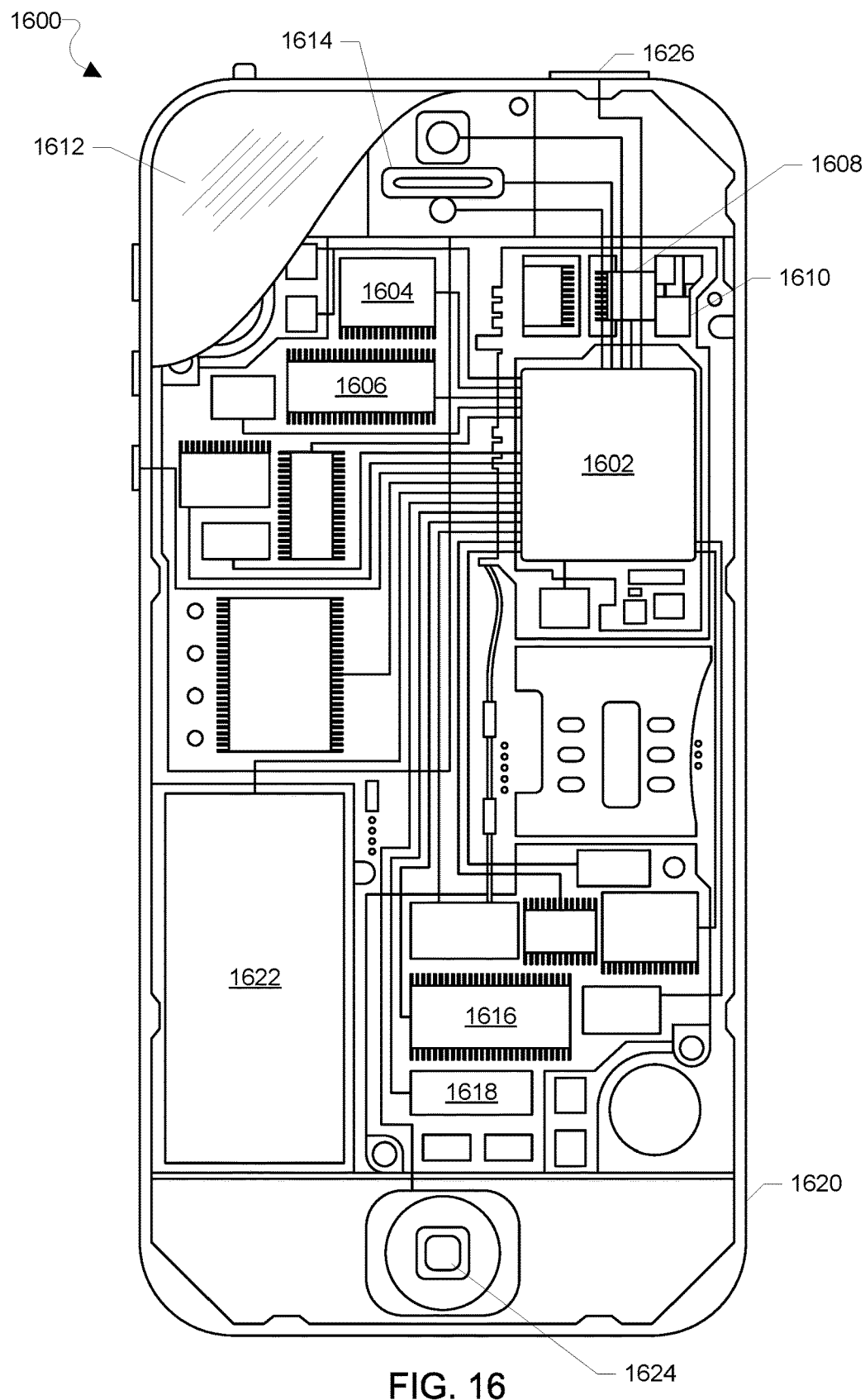
FIG. 16 is a component block diagram illustrating an example mobile computing device suitable for use with the various aspects.

The various aspects (including, but not limited to, aspects described above with reference to FIGS. 1-15) may be implemented in a wide variety of computing systems including mobile computing devices, an example of which suitable for use with the various aspects is illustrated in FIG. 16. The mobile computing device 1600 may include a processor 1602 coupled to a touchscreen controller 1604 and an internal memory 1606. The processor 1602 may be one or more multicore integrated circuits designated for general or specific processing tasks. The internal memory 1606 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1604 and the processor 1602 may also be coupled to a touchscreen panel 1612, such as a resistive-sensing touchscreen, capacitive-sensing touchscreen, infrared sensing touchscreen, etc. Additionally, the display of the computing device 1600 need not have touch screen capability.

The mobile computing device 1600 may have one or more radio signal transceivers 1608 (e.g., Peanut, Bluetooth, ZigBee, Wi-Fi, RF radio) and antennae 1610, for sending and receiving communications, coupled to each other and/or to the processor 1602. The transceivers 1608 and antennae 1610 may be used with the above-mentioned circuitry to implement the various wireless transmission protocol stacks and interfaces. The mobile computing device 1600 may include a cellular network wireless modem chip 1616 that enables communication via a cellular network and is coupled to the processor.

The mobile computing device 1600 may include a peripheral device connection interface 1618 coupled to the processor 1602. The peripheral device connection interface 1618 may be singularly configured to accept one type of connection, or may be configured to accept various types of physical and communication connections, common or proprietary, such as Universal Serial Bus (USB), FireWire, Thunderbolt, or PCIe. The peripheral device connection interface 1618 may also be coupled to a similarly configured peripheral device connection port (not shown).

The mobile computing device 1600 may also include speakers 1614 for providing audio outputs. The mobile computing device 1600 may also include a housing 1620, constructed of a plastic, metal, or a combination of materials, for containing all or some of the components described herein. The mobile computing device 1600 may include a power source 1622 coupled to the processor 1602, such as a disposable or rechargeable battery. The rechargeable battery may also be coupled to the peripheral device connection port to receive a charging current from a source external to the mobile computing device 1600. The mobile computing device 1600 may also include a physical button 1624 for receiving user inputs. The mobile computing device 1600 may also include a power button 1626 for turning the mobile computing device 1600 on and off.

Figure 17:
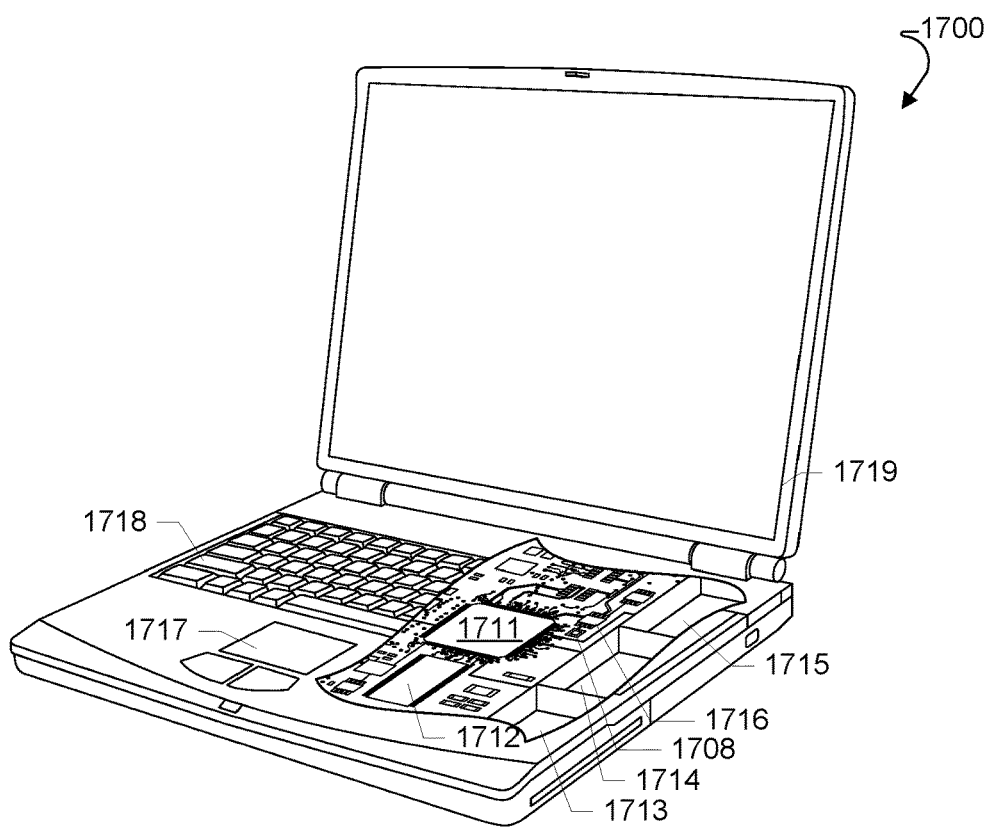
FIG. 17 is a component block diagram illustrating an example mobile computing device suitable for use with the various aspects.

The various aspects (including, but not limited to, aspects described above with reference to FIGS. 1-15) may be implemented in a wide variety of computing systems include a laptop computer 1700 an example of which is illustrated in FIG. 17. Many laptop computers include a touchpad touch surface 1717 that serves as the computer's pointing device, and thus may receive drag, scroll, and flick gestures similar to those implemented on computing devices equipped with a touch screen display and described above. A laptop computer 1700 will typically include a processor 1711 coupled to volatile memory 1712 and a large capacity nonvolatile memory, such as a disk drive 1713 of Flash memory. Additionally, the computer 1700 may have one or more antenna 1708 for sending and receiving electromagnetic radiation that may be connected to a wireless data link and/or cellular telephone transceiver 1716 coupled to the processor 1711. The computer 1700 may also include a floppy disc drive 1714 and a compact disc (CD) drive 1715 coupled to the processor 1711. In a notebook configuration, the computer housing includes the touchpad 1717, the keyboard 1718, and the display 1719 all coupled to the processor 1711. Other configurations of the computing device may include a computer mouse or trackball coupled to the processor (e.g., via a USB input) as are well known, which may also be used in conjunction with the various aspects.

Figure 18:
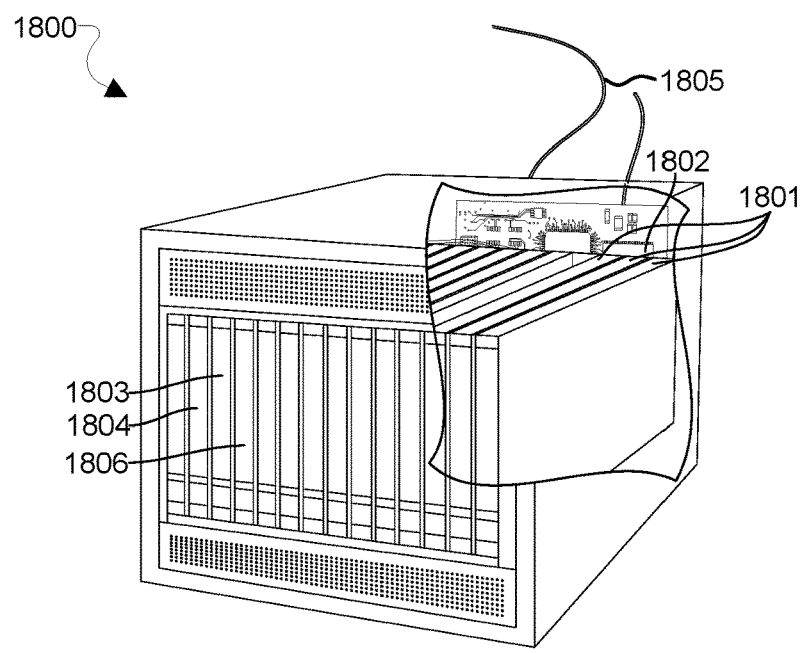
FIG. 18 is a component block diagram illustrating an example server suitable for use with the various aspects.

The various aspects (including, but not limited to, aspects described above with reference to FIGS. 1-15) may also be implemented in fixed computing systems, such as any of a variety of commercially available servers. An example server 1800 is illustrated in FIG. 18. Such a server 1800 typically includes one or more multicore processor assemblies 1801 coupled to volatile memory 1802 and a large capacity nonvolatile memory, such as a disk drive 1804. As illustrated in FIG. 18, multicore processor assemblies 1801 may be added to the server 1800 by inserting them into the racks of the assembly. The server 1800 may also include a floppy disc drive, compact disc (CD) or digital versatile disc (DVD) disc drive 1806 coupled to the processor 1801. The server 1800 may also include network access ports 1803 coupled to the multicore processor assemblies 1801 for establishing network interface connections with a network 1805, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of automatic cache coherency for page table data on a computing device, comprising:
    modifying, by a first processing device, page table data stored in a first cache associated with the first processing device;
    receiving, at a page table coherency unit, a page table cache invalidate signal from the first processing device;
    issuing, by the page table coherency unit, a cache maintenance operation command to the first processing device; and
    writing, by the first processing device, the modified page table data stored in the first cache to a shared memory accessible by the first processing device and a second processing device associated with a second cache storing the page table data.

2. The method of claim 1, further comprising:
    executing, by the page table coherency unit, a page table walk of the modified page table data stored in the first cache,
    wherein issuing a cache maintenance operation command comprises issuing the cache maintenance operation command for a page table entry of the page table walk.

3. The method of claim 2, further comprising:
identifying, by the page table coherency unit, a modified page table entry in the modified page table data,
wherein issuing a cache maintenance operation command for the page table entry of the page table walk comprises issuing the cache maintenance operation command for the modified page table entry in the modified page table data of the page table walk.

4. The method of claim 2, further comprising:
storing, by the page table coherency unit in a third cache, the page table data stored in the first cache,
wherein executing a page table walk of the modified page table data comprises executing the page table walk using the page table data stored in the third cache.

5. The method of claim 2, wherein:
the page table cache invalidate signal includes a virtual address of the page table entry of the modified page table data; and
executing a page table walk of the modified page table data comprises executing the page table walk searching for the virtual address of the page table entry of the modified page table data.

6. The method of claim 2, wherein executing a page table walk of the modified page table data comprises executing the page table walk of the modified page table data via a master memory management unit communicatively connected to the page table coherency unit.

7. The method of claim 1, further comprising:
determining, by the page table coherency unit, whether the cache maintenance operation command is completed by the first processing device; and
sending, by the page table coherency unit, a first acknowledgement of the page table cache invalidate signal to the first processing device in response to determining that the cache maintenance operation command is completed by the first processing device.

8. The method of claim 7, wherein sending a first acknowledgement of the page table cache invalidate signal comprises:
sending the first acknowledgement of the page table cache invalidate signal to a master memory management unit; and
sending, by the master memory management unit, a second acknowledgement of the page table cache invalidate signal configured to represent the first acknowledgement to the first processing device.

9. A computing device, comprising:
a first processing device;
a second processing device; and
a page table coherency unit,
wherein the first processing device, the second processing device, and the page table coherency unit are configured to perform respective operations comprising:
modifying, by the first processing device, page table data stored in a first cache associated with the first processing device;
receiving, at the page table coherency unit, a page table cache invalidate signal from the first processing device;
issuing, by the page table coherency unit, a cache maintenance operation command to the first processing device; and
writing, by the first processing device, the modified page table data stored in the first cache to a shared memory accessible by the first processing device and the second processing device associated with a second cache storing the page table data.

10. The computing device of claim 9, wherein the first processing device, the second processing device, and the page table coherency unit are further configured to perform respective operations comprising:
executing, by the page table coherency unit, a page table walk of the modified page table data stored in the first cache,
wherein issuing a cache maintenance operation command comprises issuing the cache maintenance operation command for a page table entry of the page table walk.

11. The computing device of claim 10, wherein the first processing device, the second processing device, and the page table coherency unit are further configured to perform respective operations comprising:
identifying, by the page table coherency unit, a modified page table entry in the modified page table data,
wherein issuing a cache maintenance operation command for the page table entry of the page table walk comprises issuing the cache maintenance operation command for the modified page table entry in the modified page table data of the page table walk.

12. The computing device of claim 10, wherein the first processing device, the second processing device, and the page table coherency unit are further configured to perform respective operations comprising:
storing, by the page table coherency unit in a third cache, the page table data stored in the first cache,
wherein executing a page table walk of the modified page table data comprises executing the page table walk using the page table data stored in the third cache.

13. The computing device of claim 10, wherein the first processing device, the second processing device, and the page table coherency unit are further configured to perform respective operations such that:
the page table cache invalidate signal includes a virtual address of the page table entry of the modified page table data; and
executing a page table walk of the modified page table data comprises executing the page table walk searching for the virtual address of the page table entry of the modified page table data.

14. The computing device of claim 10, wherein the first processing device, the second processing device, and the page table coherency unit are further configured to perform respective operations such that executing a page table walk of the modified page table data comprises executing the page table walk of the modified page table data via a master memory management unit communicatively connected to the page table coherency unit.

15. The computing device of claim 9, wherein the first processing device, the second processing device, and the page table coherency unit are further configured to perform respective operations comprising:
determining, by the page table coherency unit, whether the cache maintenance operation command is completed by the first processing device; and
sending, by the page table coherency unit, a first acknowledgement of the page table cache invalidate signal to the first processing device in response to determining that the cache maintenance operation command is completed by the first processing device.

16. The computing device of claim 15, wherein the first processing device, the second processing device, and the page table coherency unit are further configured to perform respective operations such that sending a first acknowledgement of the page table cache invalidate signal comprises:

sending the first acknowledgement of the page table cache invalidate signal to a master memory management unit; and sending, by the master memory management unit, a second acknowledgement of the page table cache invalidate signal configured to represent the first acknowledgement to the first processing device.

17. A method of automatic cache coherency for data on a computing device, comprising:

sending, by a first processing device, identifying information of a location of data stored in a first cache associated with the first processing device to a page table coherency unit;

monitoring, by the page table coherency unit, for a write command by the first processing device to the first cache for the location of the data;

issuing, by the page table coherency unit, a cache maintenance operation command to the first processing device; and writing, by the first processing device, the data modified as a result of the write command from the first processing device and stored in the first cache to a shared memory accessible by the first processing device and a second processing device associated with a second cache storing the data.

18. The method of claim 17, wherein:

the data is page table data;

sending identifying information of a location of data comprises sending a physical address range containing the page table data in the first cache; and monitoring for a write command by the first processing device to the first cache for the location of the data comprises monitoring for a write command in the physical address range of the first cache, the method further comprising:

storing, by the page table coherency unit, the physical address range.

19. The method of claim 17, wherein:

sending identifying information of a location of data comprises sending a virtual address range and an address space identifier containing the data in the first cache; and monitoring for a write command by the first processing device to the first cache for the location of the data comprises monitoring for a write command including a target virtual address in the virtual address range and a target address space identifier the same as the address space identifier, the method further comprising:

storing, by the page table coherency unit, the virtual address range and the address space identifier.

20. The method of claim 19, further comprising monitoring, by the page table coherency unit, for a write command by a third processing device to the first cache including a target virtual address in the virtual address range and a target address space identifier the same as the address space identifier.

21. The method of claim 17, wherein monitoring for a write command by the first processing device to the first cache for the location of the data comprises monitoring for a write command via a fully coherent port of the page table coherency unit.

22. The method of claim 17, further comprising implementing a synchronization operation for the second cache selected from one of:

sending, by the first processing device, a page table cache invalidate signal to the second processing device;

sending, by the first processing device, an explicit synchronization command to the second processing device; and waiting, by the second processing device, a designated period prior to implementing the synchronization operation.

23. The method of claim 17, further comprising waiting, by the page table coherency unit, a designated period before issuing the cache maintenance operation command to the first processing device.

24. A computing device, comprising:

a first processing device;

a second processing device; and a page table coherency unit, wherein the first processing device, the second processing device, and the page table coherency unit are configured to perform respective operations comprising:

sending, by the first processing device, identifying information of a location of data stored in a first cache associated with the first processing device to the page table coherency unit;

monitoring, by the page table coherency unit, for a write command by the first processing device to the first cache for the location of the data;

issuing, by the page table coherency unit, a cache maintenance operation command to the first processing device; and writing, by the first processing device, the data modified as a result of the write command from the first processing device and stored in the first cache to a shared memory accessible by the first processing device and the second processing device associated with a second cache storing the data.

25. The computing device of claim 24, wherein the first processing device, the second processing device, and the page table coherency unit are configured to perform respective operations such that:

the data is page table data;

sending identifying information of a location of data comprises sending a physical address range containing the page table data in the first cache; and monitoring for a write command by the first processing device to the first cache for the location of the data comprises monitoring for a write command in the physical address range of the first cache, and wherein the first processing device, the second processing device, and the page table coherency unit are configured to perform respective operations further comprising:

storing, by the page table coherency unit, the physical address range.

26. The computing device of claim 24, wherein the first processing device, the second processing device, and the page table coherency unit are configured to perform respective operations such that:

sending identifying information of a location of data comprises sending a virtual address range and an address space identifier containing the data in the first cache; and monitoring for a write command by the first processing device to the first cache for the location of the data comprises monitoring for a write command including a target virtual address in the virtual address range and a target address space identifier the same as the address space identifier, and wherein the first processing device, the second processing device, and the page table coherency unit are configured to perform respective operations further comprising:
   storing, by the page table coherency unit, the virtual address range and the address space identifier.

27. The computing device of claim 26, wherein the first processing device, the second processing device, and the page table coherency unit are configured to perform respective operations further comprising monitoring, by the page table coherency unit, for a write command by a third processing device to the first cache including a target virtual address in the virtual address range and a target address space identifier the same as the address space identifier.

28. The computing device of claim 24, wherein the first processing device, the second processing device, and the page table coherency unit are further configured to perform respective operations such that monitoring for a write command by the first processing device to the first cache for the location of the data comprises monitoring for a write command via a fully coherent port of the page table coherency unit.

29. The computing device of claim 24, wherein the first processing device, the second processing device, and the page table coherency unit are further configured to perform respective operations comprising implementing a synchronization operation for the second cache selected from one of:
   sending, by the first processing device, a page table cache invalidate signal to the second processing device;
   sending, by the first processing device, an explicit synchronization command to the second processing device; and
   waiting, by the second processing device, a designated period prior to implementing the synchronization operation.

30. The computing device of claim 24, wherein the first processing device, the second processing device, and the page table coherency unit are further configured to perform respective operations comprising waiting, by the page table coherency unit, a designated period before issuing the cache maintenance operation command to the first processing device.

* * * * *